United States Patent
Bdeir et al.

(10) Patent No.: US 11,616,844 B2
(45) Date of Patent: Mar. 28, 2023

(54) MODULAR ELECTRONIC AND DIGITAL BUILDING SYSTEMS AND METHODS OF USING THE SAME

(71) Applicant: Sphero, Inc., Boulder, CO (US)

(72) Inventors: Aya Bdeir, New York, NY (US); Alin Cosmanescu, Tenafly, NJ (US); Sean Schumer, New York, NY (US); Stanley Okrasinski, New York, NY (US); Andrew Tergis, New York, NY (US); Kristin Salomon, New York, NY (US); Edward Bear, New York, NY (US); Julio Liriano, Fort Lee, NJ (US); David Newton, Rye, NY (US); John Perkins, Tallahassee, FL (US); David Sharp, New York, NY (US); Sameer More, New York, NY (US); Paul Rothman, Brooklyn, NY (US)

(73) Assignee: Sphero, Inc., Boulder, CO (US)

( * ) Notice: Subject to any disclaimer, the term of this patent is extended or adjusted under 35 U.S.C. 154(b) by 0 days.

(21) Appl. No.: 16/874,572

(22) Filed: May 14, 2020

(65) Prior Publication Data

US 2020/0296167 A1    Sep. 17, 2020

Related U.S. Application Data

(60) Provisional application No. 62/818,641, filed on Mar. 14, 2019.

(51) Int. Cl.
| | | |
|---|---|---|
| *H04L 67/125* | (2022.01) | |
| *H04L 41/12* | (2022.01) | |
| *H04L 69/22* | (2022.01) | |

(52) U.S. Cl.
CPC ............ *H04L 67/125* (2013.01); *H04L 41/12* (2013.01); *H04L 69/22* (2013.01)

(58) Field of Classification Search
None
See application file for complete search history.

(56) References Cited

U.S. PATENT DOCUMENTS

| | | |
|---|---|---|
| 2,493,697 A | 1/1950 | Raczkowski |
| 2,879,685 A | 3/1959 | Page |

(Continued)

FOREIGN PATENT DOCUMENTS

CN       103563289 A   *   2/2014   ........... H04L 9/0894

OTHER PUBLICATIONS

US 10,206,284 B2, 02/2019, Bdeir (withdrawn)

*Primary Examiner* — James A Edwards

(57) ABSTRACT

In some embodiments, an electronic and digital building block system includes modular electronic building modules that can be electrically coupled together to create various different electronic devices. In addition to physical electronic modules, the system can include digital building blocks to further enhance and integrate the functions of an assembled bit-system that can be created/assembled by a user of the block electronic building system. The digital building blocks are not a physical module, but digital content or other software or cloud applications that can be represented as virtual digital blocks, and that can interface with the physical modules. The digital blocks can provide integration between the functionality of the physical building blocks and functionality of computer-based and/or web-based applications, programs and systems. The electronic and digital building block system can include a system program and a visualizer that can be viewed on the display of a computer device.

10 Claims, 36 Drawing Sheets

(56) References Cited

U.S. PATENT DOCUMENTS

| | | |
|---|---|---|
| 2,947,914 A | 8/1960 | Simons |
| 3,005,282 A | 10/1961 | Christiansen |
| 3,008,245 A | 11/1961 | Meuche |
| 3,034,254 A | 5/1962 | Christiansen |
| 3,205,407 A | 9/1965 | Thompson |
| 3,553,438 A | 1/1971 | Blitz et al. |
| 3,594,689 A | 7/1971 | Hopt et al. |
| 3,603,025 A | 9/1971 | Heubl |
| 3,640,018 A | 2/1972 | Light |
| 3,659,219 A | 4/1972 | Rueff, Jr. |
| 3,803,531 A | 4/1974 | Sorensen |
| 3,862,512 A | 1/1975 | Vogel |
| 3,863,931 A | 2/1975 | Forsyth et al. |
| 3,877,028 A | 4/1975 | Thomas |
| 3,970,805 A | 7/1976 | Thomas |
| 4,021,252 A | 5/1977 | Banczak et al. |
| D244,632 S | 6/1977 | Christiansen |
| 4,053,159 A | 10/1977 | Kulak |
| 4,064,377 A | 12/1977 | Regan |
| 4,158,921 A | 6/1979 | Stolpen |
| 4,181,824 A | 1/1980 | Seidel |
| 4,183,173 A | 1/1980 | Ogawa |
| 4,211,456 A | 7/1980 | Sears |
| 4,233,778 A | 11/1980 | Lemelson |
| 4,284,123 A | 8/1981 | Plockinger et al. |
| 4,285,563 A | 8/1981 | Crosier et al. |
| 4,314,236 A | 2/1982 | Mayer et al. |
| 4,323,243 A | 4/1982 | Hanson et al. |
| 4,348,191 A | 9/1982 | Lipsitz et al. |
| D267,895 S | 2/1983 | Petrie |
| 4,376,538 A | 3/1983 | Keenan |
| 4,449,942 A | 5/1984 | Salit |
| 4,456,321 A | 6/1984 | Jones et al. |
| 4,496,149 A | 1/1985 | Schwartzberg |
| 4,510,210 A | 4/1985 | Hunt |
| 4,516,260 A | 5/1985 | Breedlove et al. |
| 4,538,675 A | 9/1985 | Welsh |
| 4,542,784 A | 9/1985 | Welsh |
| 4,546,267 A | 10/1985 | Urfirer |
| 4,547,027 A | 10/1985 | Scheibenreif |
| 4,552,541 A | 11/1985 | Bolli |
| 4,556,272 A | 12/1985 | Briones |
| 4,556,393 A | 12/1985 | Bolli |
| 4,578,649 A | 3/1986 | Shupe |
| 4,606,732 A | 8/1986 | Lyman |
| 4,712,184 A | 12/1987 | Haugerud |
| 4,736,367 A | 4/1988 | Wroblewski et al. |
| 4,743,202 A | 5/1988 | Bach |
| 4,796,891 A | 1/1989 | Milner |
| 4,820,233 A | 4/1989 | Weiner |
| 4,838,794 A | 6/1989 | Coddington |
| 4,840,602 A | 6/1989 | Rose |
| 4,846,687 A | 7/1989 | White et al. |
| 4,853,884 A | 8/1989 | Brown et al. |
| 4,874,176 A | 10/1989 | Auerbach |
| 4,878,848 A | 11/1989 | Ingalsbe |
| 4,883,440 A | 11/1989 | Bolli |
| 4,890,241 A | 12/1989 | Hoffman et al. |
| 4,893,817 A | 1/1990 | Shilo |
| 4,905,176 A | 2/1990 | Schulz |
| 4,910,396 A | 3/1990 | Grove |
| 4,936,780 A | 6/1990 | Cogliano |
| 4,937,811 A | 6/1990 | Harris |
| 4,964,833 A | 10/1990 | Suzuki |
| 4,968,255 A | 11/1990 | Lee et al. |
| 4,969,827 A | 11/1990 | Hahs, Jr. |
| 4,978,317 A | 12/1990 | Pocrass |
| 5,013,276 A | 5/1991 | Garfinkel |
| 5,088,951 A | 2/1992 | Majurinen |
| 5,090,701 A | 2/1992 | Chang |
| D324,551 S | 3/1992 | Skov |
| 5,172,534 A | 12/1992 | Milner et al. |
| 5,190,287 A | 3/1993 | Ishiyama |
| 5,191,276 A | 3/1993 | Zainaleain |
| 5,203,711 A | 4/1993 | Bogiel |
| 5,205,758 A | 4/1993 | Comerci et al. |
| D335,508 S | 5/1993 | Skov |
| 5,227,232 A | 7/1993 | Lim |
| 5,236,375 A | 8/1993 | Kachlic |
| D339,613 S | 9/1993 | Pimat |
| 5,244,403 A | 9/1993 | Smith et al. |
| 5,275,567 A | 1/1994 | Whitfield |
| 5,281,154 A | 1/1994 | Comerci et al. |
| 5,304,069 A | 4/1994 | Brunker et al. |
| 5,319,241 A | 6/1994 | Lim |
| 5,345,221 A | 9/1994 | Pons et al. |
| 5,349,129 A | 9/1994 | Wisniewski et al. |
| 52,750 A | 11/1994 | Kushner et al. |
| 5,371,355 A | 12/1994 | Wodecki |
| 54,318 A | 1/1995 | Ryaa et al. |
| 5,380,951 A | 1/1995 | Comerci et al. |
| 5,385,344 A | 1/1995 | Miller et al. |
| 5,409,227 A | 4/1995 | Walker |
| 5,423,684 A | 6/1995 | Ishikawa |
| 5,445,552 A | 8/1995 | Hine |
| 5,447,433 A | 9/1995 | Perry, Jr. |
| 5,451,178 A | 9/1995 | Yorozu et al. |
| 5,452,201 A | 9/1995 | Pieronek et al. |
| 5,455,749 A | 10/1995 | Ferber |
| 5,459,283 A | 10/1995 | Birdwell, Jr. |
| 5,462,443 A | 10/1995 | Kurbjuhn et al. |
| 5,463,486 A | 10/1995 | Stevens |
| 5,467,102 A | 11/1995 | Kuno et al. |
| 5,469,331 A | 11/1995 | Conway et al. |
| D365,756 S | 1/1996 | Rask et al. |
| 5,490,252 A * | 2/1996 | Macera ............ H04L 12/5692 |
| | | 370/402 |
| 5,512,710 A | 4/1996 | Schroeder |
| D370,035 S | 5/1996 | Olsen |
| D371,583 S | 7/1996 | Knudsen |
| 5,547,399 A | 8/1996 | Naghi et al. |
| 5,547,933 A | 8/1996 | Lin |
| 5,558,542 A | 9/1996 | O'Sullivan et al. |
| D374,257 S | 10/1996 | Schmidt et al. |
| 5,563,771 A | 10/1996 | Bethurum |
| 5,574,312 A | 11/1996 | Bayerer et al. |
| 5,580,283 A | 12/1996 | O'Sullivan et al. |
| 5,596,233 A | 1/1997 | Leiber et al. |
| 5,607,336 A | 3/1997 | Lebensfeld et al. |
| 5,610,931 A | 3/1997 | Huang |
| D378,837 S | 4/1997 | Olsen et al. |
| 5,645,463 A | 7/1997 | Olsen |
| 5,648,892 A | 7/1997 | Wieloch et al. |
| 5,651,685 A | 7/1997 | Brinkman et al. |
| 5,658,155 A | 8/1997 | McFarlane et al. |
| 5,661,470 A | 8/1997 | Karr |
| 5,663,938 A | 9/1997 | Dang et al. |
| 5,667,411 A | 9/1997 | O'Sullivan et al. |
| D385,926 S | 11/1997 | Nielsen |
| 5,697,829 A | 12/1997 | Chainani et al. |
| 5,703,761 A | 12/1997 | Heiss |
| 89,408 A | 1/1998 | Rask et al. |
| 5,705,853 A | 1/1998 | Faller et al. |
| 5,721,496 A | 2/1998 | Farnworth et al. |
| 5,722,861 A | 3/1998 | Wetter |
| 5,724,074 A | 3/1998 | Chainani et al. |
| 5,739,050 A | 4/1998 | Farnworth |
| 5,742,169 A | 4/1998 | Akram et al. |
| 5,742,486 A | 4/1998 | Yangkuai |
| 5,746,638 A | 5/1998 | Shiraishi |
| 5,747,940 A | 5/1998 | Openiano |
| 5,766,077 A | 6/1998 | Hongo |
| 5,779,515 A | 7/1998 | Chung |
| 5,799,067 A | 8/1998 | Kikinis et al. |
| RE35,896 E | 9/1998 | Ranker et al. |
| 5,812,397 A | 9/1998 | Pech et al. |
| 5,838,161 A | 11/1998 | Akram et al. |
| 5,841,360 A | 11/1998 | Binder |
| 5,845,503 A | 12/1998 | Choi |
| 5,848,503 A | 12/1998 | Toft et al. |
| 5,850,581 A | 12/1998 | Roller |
| 5,853,327 A | 12/1998 | Gilboa |
| 5,872,354 A | 2/1999 | Hanson |
| 5,901,263 A | 5/1999 | Gaio et al. |

(56) References Cited

U.S. PATENT DOCUMENTS

| | | |
|---|---|---|
| 5,902,155 A | 5/1999 | Polgar et al. |
| 5,921,864 A | 7/1999 | Walker et al. |
| 5,947,787 A | 9/1999 | Cyrus et al. |
| 5,949,010 A | 9/1999 | Hacker |
| 5,956,046 A | 9/1999 | Kehlet et al. |
| 5,966,526 A | 10/1999 | Yokoi |
| 5,971,855 A | 10/1999 | Ng |
| 5,984,756 A | 11/1999 | Krog |
| 6,024,626 A | 2/2000 | Mendelsohn |
| 6,030,270 A | 2/2000 | Krog |
| 6,062,937 A | 5/2000 | Kikuchi |
| 6,099,353 A | 8/2000 | Wu |
| 6,102,766 A | 8/2000 | Leadbetter et al. |
| 6,110,000 A | 8/2000 | Ting |
| 6,132,281 A | 10/2000 | Klitsner et al. |
| 6,147,552 A | 11/2000 | Sauer |
| 6,165,068 A | 12/2000 | Sonoda et al. |
| 6,168,494 B1 | 1/2001 | Engel et al. |
| 6,171,168 B1 | 1/2001 | Jessop |
| 6,190,174 B1 | 2/2001 | Lam |
| 6,206,745 B1 | 3/2001 | Gabai et al. |
| 6,213,871 B1 | 4/2001 | Yokoi |
| 6,222,665 B1 | 4/2001 | Neuner et al. |
| 6,227,931 B1 | 5/2001 | Shackelford |
| 6,227,966 B1 | 5/2001 | Yokoi |
| 6,233,502 B1 | 5/2001 | Yim |
| 6,236,796 B1 | 5/2001 | Tamura et al. |
| 6,237,914 B1 | 5/2001 | Saltanov et al. |
| 6,271,453 B1 | 8/2001 | Hacker |
| 6,280,278 B1 | 8/2001 | Wells |
| 6,290,565 B1 | 9/2001 | Galyean, III et al. |
| 6,297,785 B1 | 10/2001 | Sommer et al. |
| 6,306,039 B1 | 10/2001 | Kaji et al. |
| 6,380,844 B2 | 4/2002 | Pelekis |
| 6,422,941 B1 | 7/2002 | Thorner et al. |
| 6,425,581 B1 | 7/2002 | Barrett |
| 6,438,456 B1 | 8/2002 | Feddema et al. |
| 6,443,796 B1 | 9/2002 | Shackelford |
| 6,454,624 B1 | 9/2002 | Duff et al. |
| 6,469,901 B1 | 10/2002 | Costner |
| 6,477,444 B1 | 11/2002 | Bennett, III et al. |
| 6,477,593 B1 | 11/2002 | Khosrowpour et al. |
| 6,478,583 B1 | 11/2002 | Standiford et al. |
| 6,480,510 B1 | 11/2002 | Binder |
| 6,505,087 B1 | 1/2003 | Lucas et al. |
| 6,527,611 B2 | 3/2003 | Cummings |
| 6,535,907 B1 | 3/2003 | Hachiya et al. |
| D473,849 S | 4/2003 | Yeh |
| 6,540,606 B1 | 4/2003 | Matsukata |
| 6,540,614 B1 | 4/2003 | Nishino et al. |
| 6,560,511 B1 | 5/2003 | Yokoo et al. |
| 6,563,413 B1 | 5/2003 | Ponweiser et al. |
| 6,569,018 B2 | 5/2003 | Jaffe |
| 6,574,234 B1 | 6/2003 | Myer et al. |
| 6,575,802 B2 | 6/2003 | Yim et al. |
| 6,579,178 B1 | 6/2003 | Walker et al. |
| 6,585,553 B1 | 7/2003 | Fetridge et al. |
| 6,605,914 B2 | 8/2003 | Yim et al. |
| 6,611,537 B1 | 8/2003 | Edens et al. |
| 6,628,244 B1 | 9/2003 | Hirosawa et al. |
| 6,629,771 B2 | 10/2003 | Chiu |
| 6,634,920 B1 | 10/2003 | Michaelsen |
| 6,652,383 B1 | 11/2003 | Sonoda et al. |
| 6,679,751 B1 | 1/2004 | Maxwell et al. |
| 6,682,230 B1 | 1/2004 | Demangone et al. |
| 6,682,392 B2 | 1/2004 | Chan |
| 6,687,128 B2 | 2/2004 | Tokuhara |
| 6,692,001 B2 | 2/2004 | Romano |
| 6,692,310 B2 | 2/2004 | Zaderej et al. |
| 6,719,603 B2 | 4/2004 | Chau |
| 6,725,128 B2 | 4/2004 | Hogg et al. |
| 6,727,177 B1 | 4/2004 | Catabay et al. |
| 6,752,680 B1 | 6/2004 | Hansen |
| 6,761,609 B2 | 7/2004 | Andersen |
| 6,773,322 B2 | 8/2004 | Gabai et al. |
| 6,795,318 B2 | 9/2004 | Haas et al. |
| 6,796,808 B2 | 9/2004 | Hosoe et al. |
| 6,805,605 B2 | 10/2004 | Reining et al. |
| 6,819,304 B2 | 11/2004 | Branson |
| 6,850,426 B2 | 2/2005 | Kojori et al. |
| 6,893,316 B2 | 5/2005 | Maxwell et al. |
| 6,902,461 B1 | 6/2005 | Munch et al. |
| 6,931,656 B1 | 8/2005 | Eshelman et al. |
| 6,939,192 B1 | 9/2005 | Munch et al. |
| 6,940,783 B2 | 9/2005 | Fox et al. |
| 6,952,196 B2 | 10/2005 | Weil et al. |
| 6,956,826 B1 | 10/2005 | Binder |
| 6,965,298 B2 | 11/2005 | Feinberg |
| 6,967,274 B2 | 11/2005 | Hanington |
| 6,970,145 B1 | 11/2005 | Aoki |
| 6,979,245 B1 | 12/2005 | Goodwin |
| 6,988,008 B2 | 1/2006 | Hudson et al. |
| 7,008,324 B1 | 3/2006 | Johnson et al. |
| 7,044,825 B2 | 5/2006 | Glickman et al. |
| 7,066,778 B2 | 6/2006 | Kretzschmar |
| 7,089,083 B2 | 8/2006 | Yokoo et al. |
| 7,089,333 B2 | 8/2006 | Marinescu et al. |
| 7,104,863 B2 | 9/2006 | Mimlitch, III et al. |
| 7,124,157 B2 | 10/2006 | Ikake |
| 7,144,255 B2 | 12/2006 | Seymour |
| 7,145,933 B1 | 12/2006 | Szajnowski |
| 7,170,468 B2 | 1/2007 | Knopf |
| 7,184,272 B1 | 2/2007 | Harlacher et al. |
| 7,184,718 B2 | 2/2007 | Newman et al. |
| 7,196,676 B2 | 3/2007 | Nakamura et al. |
| 7,234,941 B2 | 6/2007 | Shuler et al. |
| 7,238,026 B2 | 7/2007 | Brown et al. |
| 7,242,369 B2 | 7/2007 | Huang |
| 7,273,377 B2 | 9/2007 | Seymour |
| 7,275,937 B2 | 10/2007 | Ellison |
| 7,297,045 B2 | 11/2007 | Pierson et al. |
| 7,311,526 B2 | 12/2007 | Rohrbach et al. |
| 7,316,567 B2 | 1/2008 | Hsieh et al. |
| 7,322,873 B2 | 1/2008 | Rosen et al. |
| 7,331,793 B2 | 2/2008 | Hernandez et al. |
| 7,333,328 B2 | 2/2008 | Funawatari et al. |
| 7,344,380 B2 | 3/2008 | Neidlein et al. |
| 7,347,760 B2 | 3/2008 | Wood et al. |
| 7,358,929 B2 | 4/2008 | Mueller et al. |
| 7,369,399 B2 | 5/2008 | Richardson |
| 7,370,974 B2 | 5/2008 | Yamada et al. |
| 7,371,177 B2 | 5/2008 | Ellis et al. |
| 7,414,186 B2 | 8/2008 | Scarpa et al. |
| D576,208 S | 9/2008 | Quercetti |
| 7,427,066 B1 | 9/2008 | Goodwin |
| D585,096 S | 1/2009 | Lin |
| 7,507,136 B2 | 3/2009 | Patton |
| 7,508,141 B2 | 3/2009 | Wong |
| 7,510,457 B2 | 3/2009 | Hussa-Lietz |
| 7,511,454 B1 | 3/2009 | Legg |
| 7,541,907 B2 | 6/2009 | Wang et al. |
| 7,555,409 B1 | 6/2009 | Bhaskar et al. |
| 7,555,658 B2 | 6/2009 | Vahid et al. |
| 7,556,563 B2 | 7/2009 | Ellis et al. |
| 7,584,565 B2 | 9/2009 | Zebersky |
| 7,585,216 B2 | 9/2009 | Foster |
| 7,596,473 B2 | 9/2009 | Hansen et al. |
| 7,611,357 B2 | 11/2009 | Han et al. |
| 7,641,477 B2 | 1/2010 | DiFonzo et al. |
| 7,645,143 B2 | 1/2010 | Rohrbach et al. |
| 7,666,054 B2 | 2/2010 | Glickman et al. |
| D614,250 S | 4/2010 | Frederiksen |
| 7,695,338 B2 | 4/2010 | Dooley et al. |
| 7,708,615 B2 | 5/2010 | Munch |
| 7,794,272 B1 | 9/2010 | Hiatt et al. |
| 7,811,150 B2 | 10/2010 | Amireh et al. |
| 7,819,114 B2 | 10/2010 | Augenbraun et al. |
| 7,828,556 B2 | 11/2010 | Rodrigues |
| 7,846,002 B1 | 12/2010 | Mikesell et al. |
| 7,893,845 B2 | 2/2011 | Ritzau |
| D635,190 S | 3/2011 | Merrill et al. |
| 7,909,697 B2 | 3/2011 | Zheng |
| 7,942,717 B2 | 5/2011 | Chou |
| 7,952,322 B2 | 5/2011 | Partovi et al. |

(56) References Cited

U.S. PATENT DOCUMENTS

| | | |
|---|---|---|
| 7,988,561 B1 | 8/2011 | Lenkarski et al. |
| 7,996,111 B2 | 8/2011 | Cheng et al. |
| 8,016,636 B2 | 9/2011 | Park |
| 8,038,532 B2 | 10/2011 | Neervoort et al. |
| 8,047,889 B2 | 11/2011 | Ishii |
| 8,052,299 B2 | 11/2011 | Lin |
| 8,057,233 B2 | 11/2011 | Owen |
| 8,061,713 B2 | 11/2011 | Cook |
| 8,079,890 B2 | 12/2011 | Seligman |
| 8,087,939 B2 | 1/2012 | Rohrbach et al. |
| 8,091,892 B2 | 1/2012 | Sternberg |
| D658,586 S | 5/2012 | Lin |
| 8,221,182 B2 | 7/2012 | Seymour et al. |
| 8,243,438 B2 | 8/2012 | Wang et al. |
| 8,321,782 B1 | 11/2012 | Broucek |
| 8,348,678 B2 | 1/2013 | Hardisty et al. |
| 8,491,312 B2 | 7/2013 | Rudisill et al. |
| 8,528,905 B2 | 9/2013 | Bianco |
| 8,567,149 B2 | 10/2013 | Kuzmin |
| 8,573,596 B2 | 11/2013 | Gearty |
| 8,576,031 B2 | 11/2013 | Lauder et al. |
| 8,602,833 B2 | 12/2013 | Binder |
| 8,616,948 B2 | 12/2013 | Sherin et al. |
| 8,690,631 B2 | 4/2014 | Nag |
| 8,753,164 B2 | 6/2014 | Hansen et al. |
| 8,932,123 B2 | 1/2015 | Murayama et al. |
| 8,951,088 B2 | 2/2015 | Binder |
| D732,475 S | 6/2015 | Bdeir |
| D751,988 S | 3/2016 | Bdeir |
| D752,519 S | 3/2016 | Bdeir |
| 9,419,378 B2 | 8/2016 | Bdeir |
| D773,992 S | 12/2016 | Krantz et al. |
| 9,597,607 B2 | 3/2017 | Bdeir |
| 9,674,108 B1* | 6/2017 | Ryan .................. G06Q 50/12 |
| 9,831,599 B2 | 11/2017 | Bdeir |
| D811,339 S | 2/2018 | Bdeir |
| D833,399 S | 11/2018 | Bdeir |
| 10,155,153 B2 | 12/2018 | Binder |
| 10,206,723 B2 | 2/2019 | Stein et al. |
| 10,985,943 B1* | 4/2021 | Beeson .................. H04L 69/18 |
| 2002/0058235 A1 | 5/2002 | Dinnerstein |
| 2002/0061701 A1 | 5/2002 | Chan |
| 2002/0107075 A1 | 8/2002 | Stephan |
| 2002/0111203 A1 | 8/2002 | Chi |
| 2002/0155783 A1 | 10/2002 | Chan |
| 2002/0186302 A1 | 12/2002 | Pulkinnen |
| 2002/0196250 A1 | 12/2002 | Anderson et al. |
| 2003/0021455 A1 | 1/2003 | Dixon et al. |
| 2003/0148249 A1 | 8/2003 | Marcus et al. |
| 2003/0162160 A1 | 8/2003 | Horchler et al. |
| 2005/0003885 A1 | 1/2005 | Rhoten |
| 2005/0049023 A1 | 3/2005 | Foster |
| 2005/0075035 A1 | 4/2005 | Hatting et al. |
| 2005/0184459 A1 | 8/2005 | Marantz et al. |
| 2005/0234592 A1 | 10/2005 | McGee et al. |
| 2005/0243489 A1 | 11/2005 | Seymour |
| 2005/0245103 A1 | 11/2005 | Ellison |
| 2006/0041730 A1 | 2/2006 | Larson |
| 2006/0100739 A1 | 5/2006 | Raffle et al. |
| 2006/0136180 A1 | 6/2006 | Hansen et al. |
| 2007/0072442 A1 | 3/2007 | DiFonzo et al. |
| 2007/0173095 A1 | 7/2007 | Bin-Nun et al. |
| 2007/0184722 A1 | 8/2007 | Doherty |
| 2007/0256337 A1 | 11/2007 | Segan |
| 2007/0262984 A1 | 11/2007 | Pruss |
| 2007/0278740 A1 | 12/2007 | Mao |
| 2008/0083149 A1 | 4/2008 | Zebersky |
| 2008/0123584 A1* | 5/2008 | Behrendt .............. H04W 28/02 370/315 |
| 2008/0166926 A1 | 7/2008 | Seymour et al. |
| 2008/0224396 A1 | 9/2008 | Cocis et al. |
| 2008/0232061 A1 | 9/2008 | Wang et al. |
| 2008/0259551 A1 | 10/2008 | Gavenda et al. |
| 2009/0034169 A1 | 2/2009 | Richardson et al. |
| 2009/0127785 A1 | 5/2009 | Kishon |
| 2009/0180243 A1 | 7/2009 | Lynch et al. |
| 2009/0189348 A1 | 7/2009 | Kucharski |
| 2009/0214051 A1 | 8/2009 | Lockett et al. |
| 2009/0279701 A1* | 11/2009 | Moisand .............. H04L 12/2856 380/270 |
| 2009/0297136 A1 | 12/2009 | Lin |
| 2009/0305602 A1 | 12/2009 | Gaute |
| 2010/0033127 A1 | 2/2010 | Griffin, Jr. et al. |
| 2010/0087119 A1 | 4/2010 | Vicentelli |
| 2010/0151738 A1 | 6/2010 | Chou |
| 2010/0197148 A1 | 8/2010 | Rudisill et al. |
| 2010/0214747 A1 | 8/2010 | Jacobs et al. |
| 2010/0259001 A1 | 10/2010 | Muller et al. |
| 2010/0311300 A1 | 12/2010 | Hansen et al. |
| 2010/0330867 A1 | 12/2010 | Fogel et al. |
| 2011/0021107 A1 | 1/2011 | Nag |
| 2011/0031689 A1 | 2/2011 | Binder |
| 2011/0059652 A1 | 3/2011 | Hoyack et al. |
| 2011/0097996 A1 | 4/2011 | Kalanithi et al. |
| 2011/0127718 A1 | 6/2011 | Wescom et al. |
| 2011/0143629 A1 | 6/2011 | Seymour et al. |
| 2011/0151743 A1 | 6/2011 | Munch et al. |
| 2011/0215998 A1 | 9/2011 | Fitzgerald et al. |
| 2011/0217898 A1 | 9/2011 | Barber |
| 2011/0221129 A1 | 9/2011 | Sisson et al. |
| 2011/0256740 A1 | 10/2011 | Naito et al. |
| 2011/0263145 A1 | 10/2011 | Kim |
| 2011/0292618 A1 | 12/2011 | Naukkarinen et al. |
| 2011/0300772 A1 | 12/2011 | Risvig |
| 2012/0063189 A1* | 3/2012 | Maurya .................. H04L 45/748 365/49.17 |
| 2012/0069502 A1 | 3/2012 | Lauder et al. |
| 2012/0122059 A1 | 5/2012 | Schweikardt et al. |
| 2012/0135613 A1 | 5/2012 | Chatterjee et al. |
| 2012/0169748 A1 | 7/2012 | Merrill et al. |
| 2012/0200034 A1 | 8/2012 | Braha et al. |
| 2012/0223479 A1 | 9/2012 | Pabon |
| 2012/0262301 A1 | 10/2012 | Davidson et al. |
| 2012/0270479 A1 | 10/2012 | Batty |
| 2013/0016483 A1 | 1/2013 | Chuang et al. |
| 2013/0050958 A1 | 2/2013 | Bdeir |
| 2013/0069305 A1 | 3/2013 | Lee et al. |
| 2013/0079080 A1 | 3/2013 | Binder |
| 2013/0234390 A1 | 9/2013 | Pabon |
| 2013/0301224 A1 | 11/2013 | Chu |
| 2013/0343025 A1* | 12/2013 | Bdeir ..................... A63H 33/26 361/803 |
| 2014/0038466 A1 | 2/2014 | Karodi et al. |
| 2015/0137448 A1 | 5/2015 | Binder |
| 2015/0236444 A1 | 8/2015 | Bdeir |
| 2016/0344136 A1 | 11/2016 | Bdeir |
| 2017/0196086 A1 | 7/2017 | Bdeir |
| 2017/0366408 A1* | 12/2017 | Kyllonen ................ H04L 41/12 |
| 2018/0212358 A1 | 7/2018 | Bdeir |
| 2019/0059041 A1* | 2/2019 | Francisco ............ H04W 40/246 |
| 2020/0107461 A1* | 4/2020 | Chia ...................... H04L 49/30 |

* cited by examiner

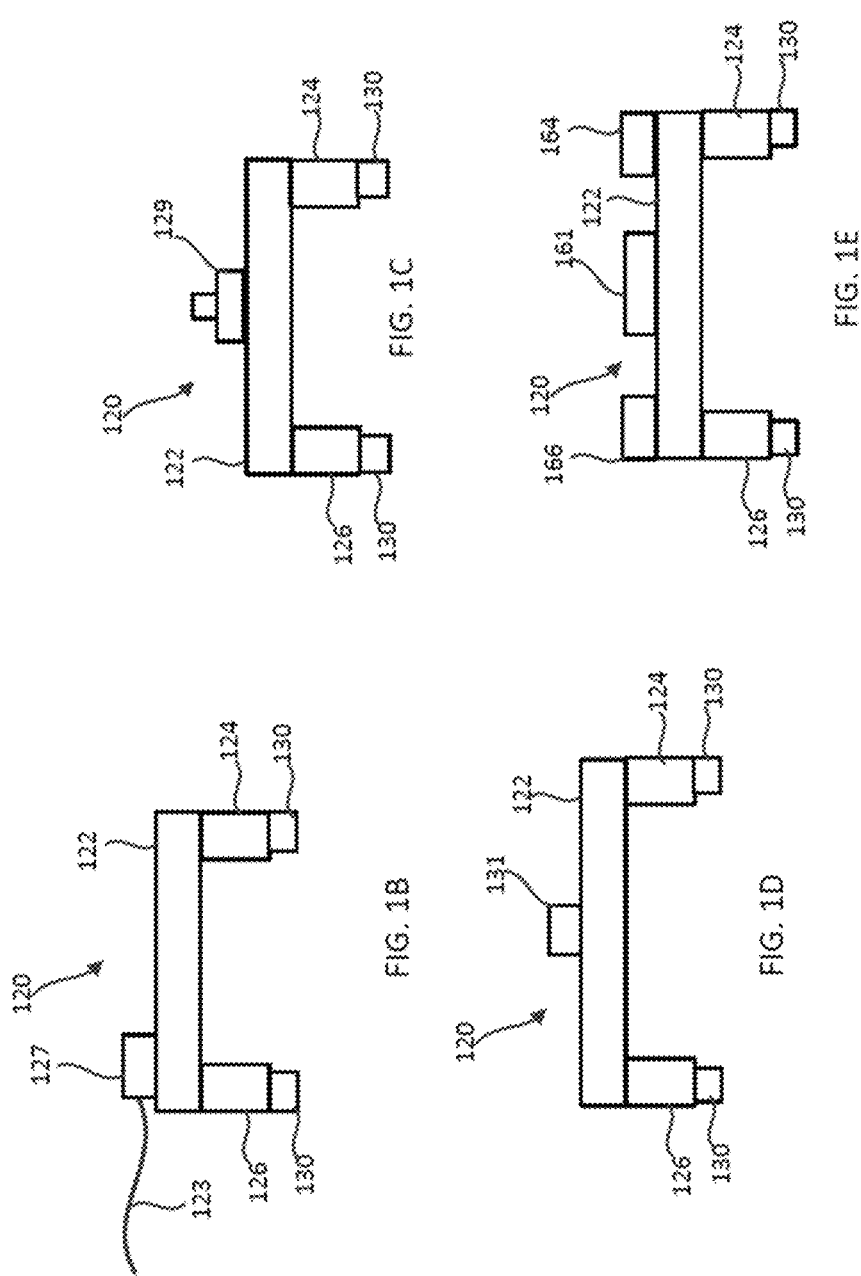

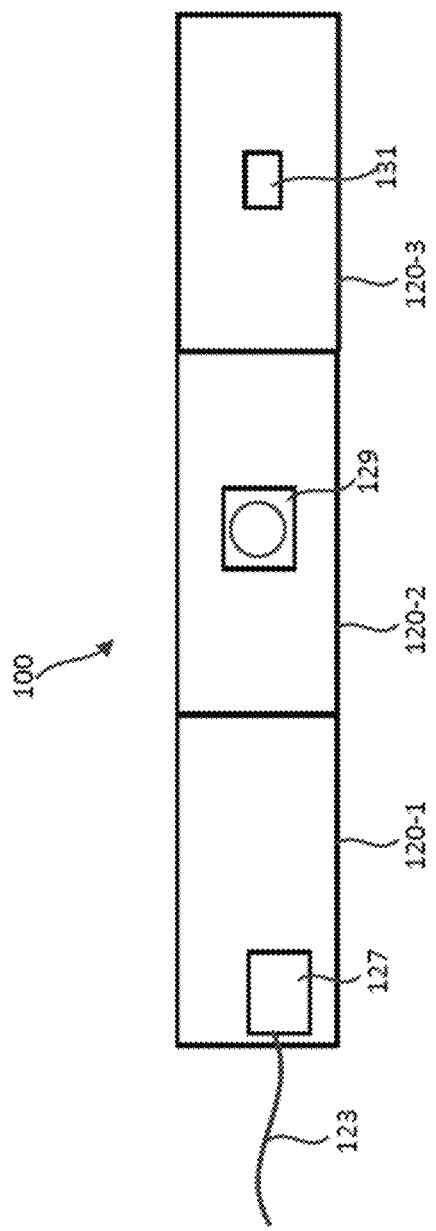

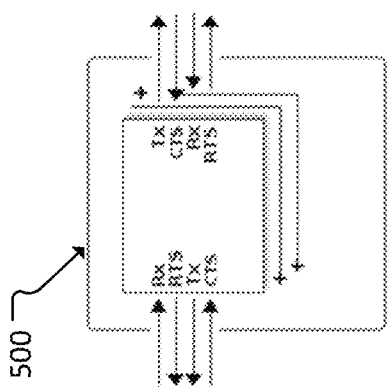
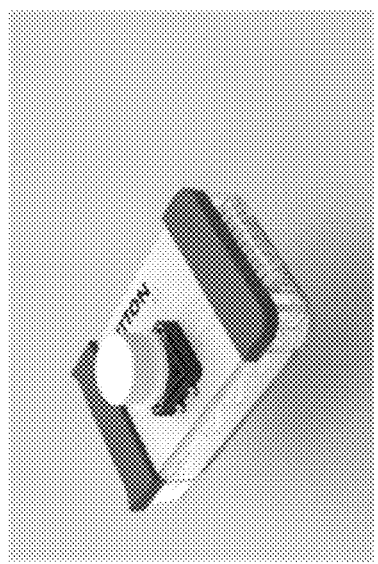
FIG. 5

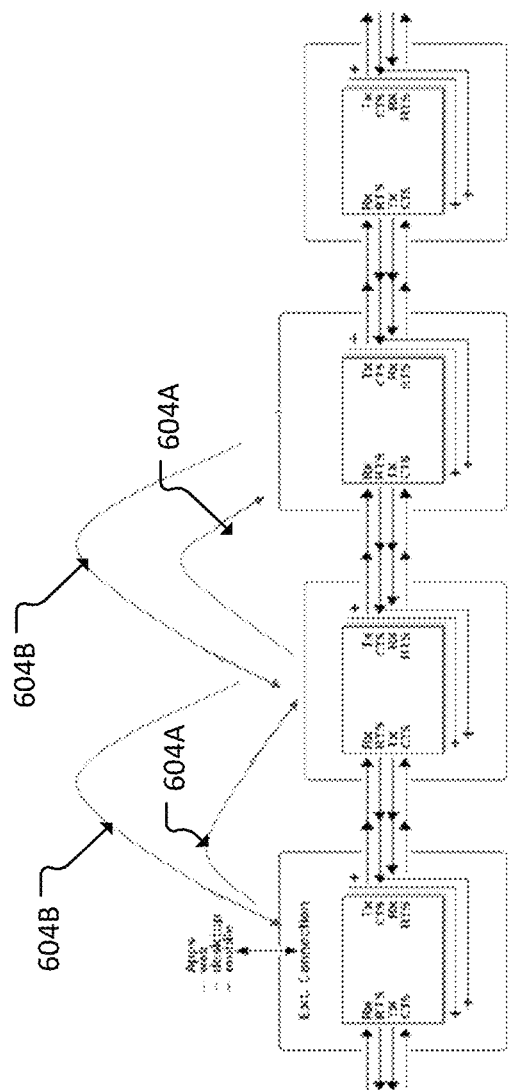

Two message types: Routed and Unrouted

All messages:

1102 → - Have a header region
1104 → - Have a payload region
- Are == 132 bytes in total length
  - Because of hardware optimizations, it's easier to always send 132 bytes
  - From the application's perspective, message can have <= 132 bytes, stack will send junk after and ignore it on the receiver.

FIG. 11

Message parts

- config (8 bits): look at msg.h
- isRouted (1 bit): Is this a routed message? 1 is yes, 0 if no
- isDirty(1 bit): Internal state check for buffers
- isTelemetry (1 bit): Can this message be packed
- msgType (5 bits): Destination for this message

FIG. 15

Route table tableLen: Number of bitSnaps to traverse in the route.

tableIdx: current bitSnap table: a table containing the path that the message must travel to reach its destination. Each 4-bit entry describes the bitSnap over which the module must retransmit the message until it has arrived (tableLen = tableIdx).

FIG. 18

TOPOLOGY DISCOVERY

- "Address" is simply index into bitcircuit table maintained on Coordinator
- The ROUTE to each bit is crucial, not "Address"
- Coordinators respond to topology requests from other Coordinators
- Non-coordinators can NOT generate routed messages
  - Caveat: "Return" route tables allow Non-coordinators to respond to Routed messages from Coordinators
- Each coordinator maintains a bitcircuit table relative to their own position in the circuit
- Coordinators can talk to the same bit concurrently and transparently
  - Caveat: Controlled access to bit functionality (ie firmware update while in bit circuit) will need to be managed at a higher layer.

FIG. 21

VISUALIZER

This is the spine of LBOS

- You connect a few superbits together on the table, they show up on the visualizer
- Topology detection knows what order they are in
- Bit basics appear interactively (based on knowing what bits are connected)
- Bit Basics are at the level of Bit cards. A line or two on what the Bit is, and how to use it. BUT bit basics don't need to change depending on what other bits its connected to

- Now the visualizer knows they are part of your library
- You also have a library of "digital Bits" that don't exist in the real world, that are partnerships or external APIs (eg: google sheets, alexa etc)

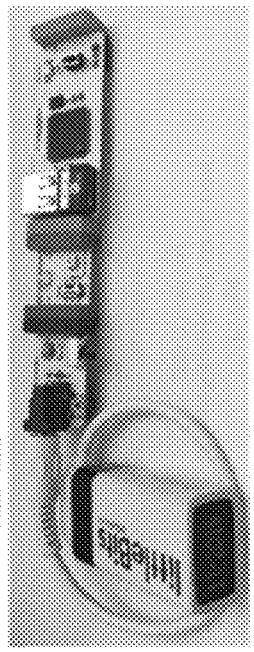

Real world

FIG. 27

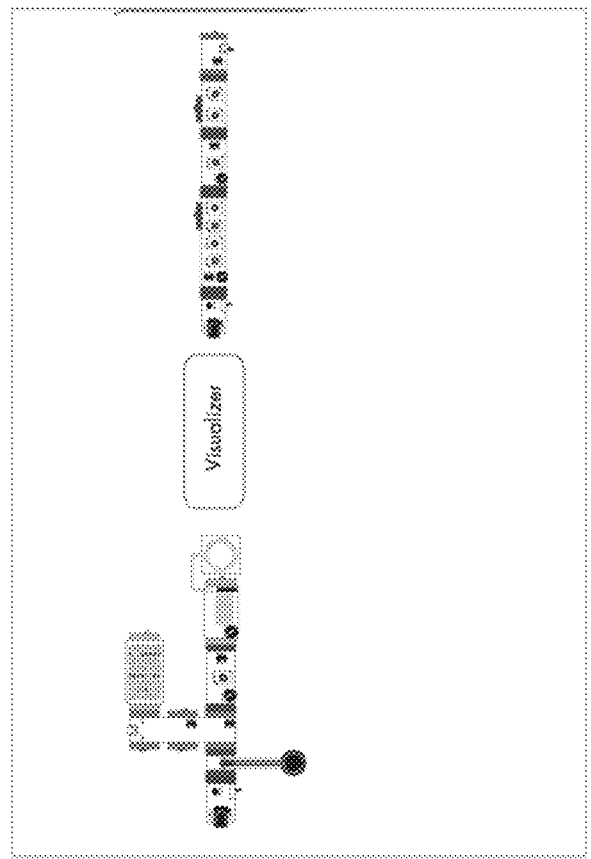
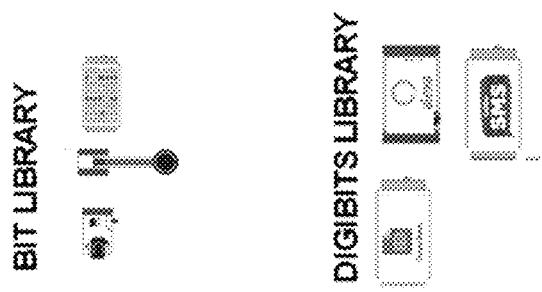
FIG. 29

MODULAR ELECTRONIC AND DIGITAL BUILDING SYSTEMS AND METHODS OF USING THE SAME

PRIORITY CLAIM

This application claims priority to and the benefit of U.S. Provisional Patent Application 62/818,641, entitled "MODULAR ELECTRONIC AND DIGITAL BUILDING SYSTEMS AND METHODS OF USING THE SAME," filed on Mar. 14, 2019, which is hereby incorporated by reference in its entirety.

CROSS-REFERENCE TO RELATED APPLICATIONS

This application is related to co-pending U.S. non-provisional patent application Ser. No. 16/223,567, filed on Dec. 18, 2018, and U.S. non-provisional patent application Ser. No. 15/845,730, filed on Dec. 18, 2017, each of the disclosures of which are incorporated herein by reference in their entirety.

This application is also related to U.S. patent application Ser. No. 13/975,923, entitled "Modular Electronic Building Systems with Magnetic Interconnections and Methods of Using the Same," filed Aug. 26, 2013, which claims priority to and the benefit of U.S. Provisional Patent Application No. 61/728,103, entitled "Modular Electronic Building Systems with Magnetic Interconnections and Methods of Using the Same," filed Nov. 19, 2012, and is a continuation-in-part of U.S. patent application Ser. No. 13/593,891, entitled "Modular Electronic Building Systems with Magnetic Interconnections and Methods of Using the Same," filed Aug. 24, 2012, which claims priority to U.S. Provisional Patent Application No. 61/527,860, filed Aug. 26, 2011, each of the disclosures of which is incorporated herein by reference in its entirety.

This application is also related to U.S. patent application Ser. No. 15/228,707, entitled "Modular Electronic Building Systems with Magnetic Interconnections and Methods of Using the Same," filed Aug. 4, 2016, which is a continuation of U.S. patent application Ser. No. 14/696,922, entitled "Modular Electronic Building Systems with Magnetic Interconnections and Methods of Using the Same," filed Apr. 27, 2015, which is a continuation of U.S. patent application Ser. No. 13/593,891, entitled "Modular Electronic Building Systems with Magnetic Interconnections and Methods of Using the Same," filed Aug. 24, 2012, which claims priority to and the benefit of U.S. Provisional Patent Application No. 61/527,860, filed Aug. 26, 2011, each of the disclosures of which is incorporated herein by reference in its entirety.

BACKGROUND

Embodiments are described herein that relate to devices and methods used in the field of electronics and, more particularly, to electronic building modules.

Some known electronic building block systems can include inter-connectable electronic components that can be used to create various projects, toys and electronic products. Some known electronic building block systems provide for intercommunications with an external electronic device such as a PC, tablet, or phone, to provide coding capabilities for select programming modules within an electronic building system, but such capabilities can be limited or have no communications capabilities based on the communications infrastructure of the particular electronic system.

Thus, a need exists for a building block system that can be used in conjunction with external electronic devices, such as a PC, tablet or phone, to provide improved and increased programming capabilities. A need also exists for digital building blocks (e.g., digital content or other software) that can interact with each other and/or with physical building blocks of a modular electronic building system.

SUMMARY

In some embodiments, an electronic and digital building block system includes modular electronic building blocks or modules that can include circuit boards and connectors to allow the modules to be electrically and mechanically coupled together in various configurations to create various different electronic devices. In addition to the physical electronic modules, the system can include digital building blocks to further enhance and integrate the functions of a bit-system that can be created by a user of the modular electronic building block system. The system digital building blocks (also referred to herein as digital blocks) are not physical modules, but digital content or other software or cloud applications that can in some embodiments be represented as virtual digital blocks, and that can interface with the physical modules of the modular electronic and digital building block system. The digital blocks can provide integration between the functionality of the physical building blocks and functionality of multiple different computer-based and/or web-based applications, programs and systems. The electronic and digital building block system can include a visualizer embodied on a computer device (e.g., PC, tablet, phone, etc.) that can be viewed on the display of the computer device and show a visualization of the physical bit-system assembled by a user.

BRIEF DESCRIPTION OF THE FIGURES

FIGS. 1B-1E are each a schematic illustration of a side view of a module of an electronic building block system, according to an embodiment, and FIG. 1F is a schematic illustration of a top view of the three modules of FIGS. 1B-1D coupled together.

FIGS. 5-22 illustrate various features and functional capabilities of an electronic building block system, according to an embodiment.

FIGS. 25-34 illustrate various features and functional capabilities of an electronic and digital building block system, according to an embodiment.

DETAILED DESCRIPTION

Figure 1A:
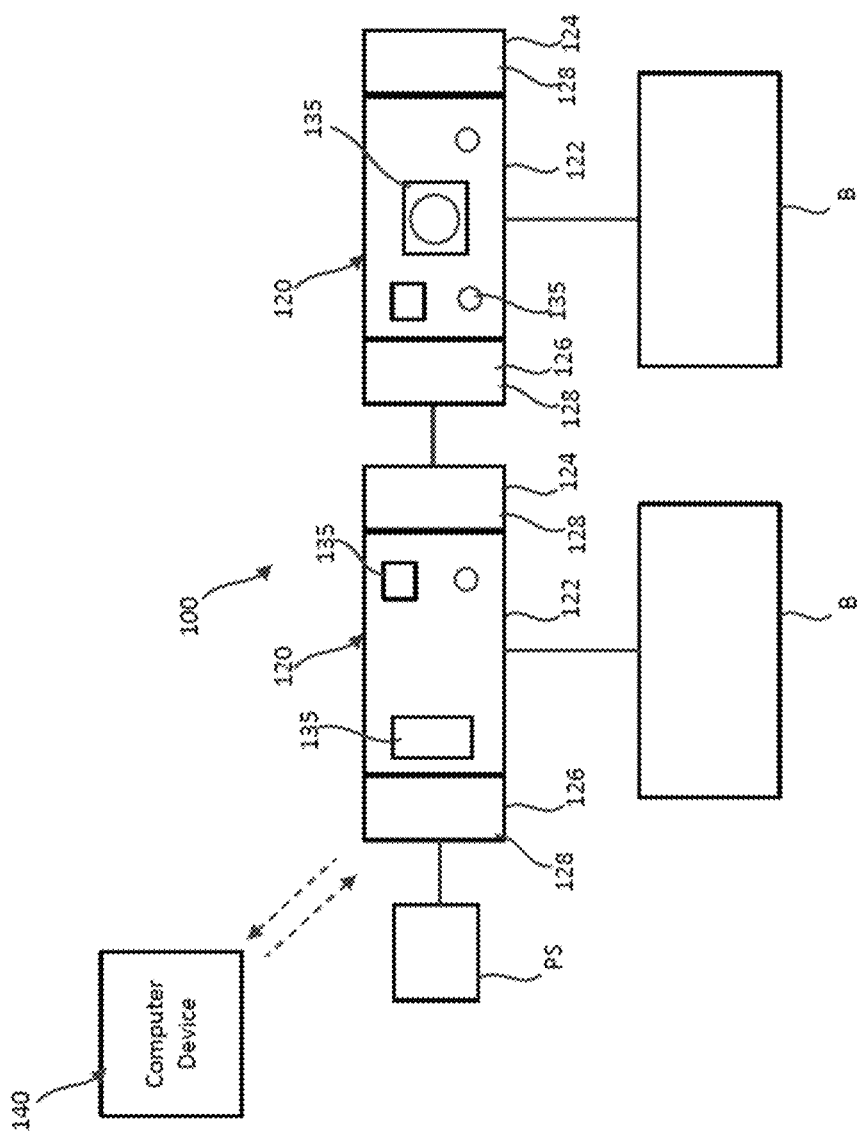
FIG. 1A is a schematic illustration of an electronic building system, according to an embodiment.

An electronic building block system is described herein that can include modular electronic building blocks or modules that include circuit boards and connectors to allow the modules to be coupled together in various configurations to create various different electronic devices. Such modules, referred to as physical modules or blocks can be assembled/interconnected as a set of modules (also referred to as a bit-system) in the real (physical) world. An electronic building block system described herein can also include digital building blocks (also referred to herein as "digital blocks" or "digibits") that are not physical modules, but digital content or other software or cloud applications that can interface with the physical modules of the modular electronic building block system. Such a system can be referred to as a modular electronic and digital building block system. The digital building blocks can further enhance and integrate the functions of a bit-system that can be created (or assembled) by a user of the modular electronic and digital building block system.

The digibits can link to a variety of different types of electronic media (e.g., Twitter, Google Sheets, email accounts, Alexa, Google Classroom, Visualization, etc.), which can be accessible to and/or by a physical bit-system in a variety of different manners to provide a variety of different functions, thereby integrating the physical world with the digital world. The system can also include a visualizer that can combine virtual representations of the physical modules with virtual representations of the digital modules (e.g., digibits).

In some embodiments, an electronic building system as described herein can include modular electronic building blocks or modules (e.g., physical modules) that include circuit boards and connectors to allow the modules to be coupled together in various configurations to create various different electronic devices. For example, the modules can be electrically coupled together and physically coupled together (e.g., mechanically coupled with for example, snap connectors, friction fit, or with magnets). In some embodiments, the physical modules are not physically connected together (e.g., in contact with each other) but instead are coupled together via Wifi® or Bluetooth®. In some embodiments, the modules can have different distinct functionalities, and can include, for example, a power module to provide power to other connected modules, input modules (e.g., including buttons, switches, sensors, etc.) to, for example, actuate other modules, and output modules having an output function such as an audible or visual output (e.g., lights, sound devices, mechanical motion devices (e.g. motors, fans, etc.). In some embodiments, the blocks have distinct functionality in that each block is configured to perform a particular function, such as, a power module providing power, a temperature sensor module configured to sense temperature, a light module configured to provide illumination, etc., but not perform the particular function of other type blocks. Some blocks can have pre-engineered functionalities and some blocks simply pass current like wire blocks. Yet other blocks can provide current, such as, for example, a power module. In some embodiments, a block or module can have multiple functions. For example, a sensor module could have a temperature sensor and a humidity sensor. In another example, in such a sensor module, the module could also include a switch to change between the two types of sensors.

An electronic building block system (also referred to as "system") described herein includes system management and function capabilities, which include, for example, individual function modules with routing capabilities. In other words, individual modules can store and forward data to other modules coupled thereto. More specifically, one or more modules can include an edge-router and perform network coordinator functions such as managing the external connections and the network traffic and topology detection within an assembled/interconnected set of modules (also referred to herein as a "bit-system"). Software on an electronic device, such as a PC, tablet or phone, that is separate from the bit-system can indirectly control and request data from downstream modules by issuing a request to the module with the edge-router functionality, which then interprets and forwards the request/response to the downstream modules. This is done through a series of APIs and notably the Field API (discussed below). In one example, the power module of a bit-system includes the edge-router and network coordinator functionalities, but other modules could also include such functionalities.

In some embodiments described herein, an electronic building block system includes physical modular electronic building blocks or modules as described above, and also digital building blocks to further enhance and integrate the functions of a bit-system that can be created (or assembled) by a user of the modular electronic and digital building block system. The physical building blocks can include circuit boards and connectors to allow the modules to be coupled together in various configurations to create various different electronic devices as described above. In some embodiments, the physical modules are not physically connected together (e.g., in contact with each other) but instead are coupled together via Wifi® or Bluetooth®. The system digital building blocks (also referred to herein as "digital blocks" or "digibits") are not physical modules, but digital content or other software or cloud applications that can interface with the physical modules of the modular electronic and digital building block system. In some embodiments, the digital building blocks can be represented on a display of a computer device as a virtual digital building block. The digital blocks can provide integration between the functionality of the physical building blocks and functionality of multiple different computer-based and/or web-based applications, programs and systems.

An electronic and digital building block system can include a visualizer embodied on a computer device (e.g., PC, tablet, phone, etc.) that can be viewed on the display of the computer device and show a virtual visualization of the physical bit-system assembled by a user. The user can code the physical modules and/or link the functionality of the physical modules to a computer-based and/or web-based application, program, service, or system. For example, as described herein the functionality of the physical modules can be integrated with an external application, such as a web-based application or service, such as Google Sheets, to record data collected using the physical modules. In another example, as described herein the functionality of the physical modules can also be integrated with a program or file located on a personal computer (PC) of a user of the modular electronic and digital building block system. For example, a user can assemble a bit-system using the physical modules and then the data output of these physical modules can be sent, for example, to a spreadsheet (e.g., in an app/software) created by the user and saved on the user's PC.

The modules within a bit-system can communicate routed and unrouted data between modules. The modules may forward routed data, may forward unrouted data, and may modify unrouted data (e.g., at an input module). More details regarding how routed and unrouted data are passed through the modules of a bit-system are described below and illustrated in the accompanying figures. The module with the edge-router and network coordinator functionalities (also referred to herein as "edge-router module" or "network coordinator module") can detect the topology of a given bit-system by sending messages to each module within a given bit-system and generating a routing table. Thus, the functionality/method of network topology detection (or discovery) described herein does not use an "address" as typically done in other systems, but instead uses a routing table (also referred to herein as a "bitcircuit table") based on the identified topology as described in more detail below. The network coordinator maintains the routing table relative to its own position within the circuit (e.g., bit-system), and uses the topology data in the control and management of the given bit system. The edge-router can act as a gateway for communications between a computer device and the modules of a bit-system.

In some embodiments, an electronic educational toy or a modular electronic building block system is provided that can teach the logic of programming and circuit building without requiring expertise in either. In some embodiments, the modular electronic building block system (also referred to herein as "system" or "block system" or "electronic building system") includes modules that include pre-assembled printed circuit boards (PCB) and connectors coupled to the PCB. In some embodiments, the connectors can be interconnected using, at least in part, small magnets. Each module (also referred to as a "block") can perform one or more discrete functions (e.g., an LED, a pushbutton, a light sensor with a threshold, etc.), and the modules can be combined to produce larger circuits. Some modules can respond to external events such as mechanical forces, touch, proximity, radio frequency signals, environmental conditions, etc. Some blocks can have pre-engineered functionalities and some blocks simply pass current like wire blocks. Yet other blocks can provide current, such as, for example, a power module.

In some embodiments, the modules described herein may be divided into categories corresponding to their function. Examples of categories can include, but are not limited to: power modules, input modules, output modules, wire modules, etc. Power modules, for example, can take current from a battery, an AC adapter (e.g., wall wart), or other power source, and convert it into current, feeding the other components of the system. In any working configuration of modules, there may be at least one power module. Input modules can include, but are not limited to: buttons, switches, sensors, etc. Output modules can include, but are not limited to: LEDs, displays, sound modules, motors, etc. In some embodiments, wire modules may not perform a particular function, but act as wire extensions, configuration changers, and in some cases logic and state modules.

In some embodiments, the general electrical operation of the system can include modules that can include a standard interface and communicate automatically when connected. In some embodiments, each module can include three or more electrical lines and such lines are interconnected between and throughout all modules. For example, the electrical lines can each be coupled to one or more conductors of a module. These lines can include, for example, data, power, signal and ground. In some embodiments, a module (s) can have at least three conductors, and includes three electrical lines including a power line, a signal line and a ground line. In some embodiments, power and signal lines of the power modules are at 5 Volts, the system is relatively low power, and the power and ground lines are shared among all the modules. In other exemplary embodiments, the power may be something other than 5 Volts such as, for example, 3V, 9V, 12V, 15V, alternating current (AC), etc. In some embodiments, a power line of a first module of a module system can provide power at a different voltage than a power line of another module of the module system. Input modules can take the incoming signal, manipulate it according to the module's function, and output the modified signal. In the case of a pressure sensor connected to a power module, for example, the sensor module takes 5 Volts into the signal line, and outputs a voltage between 0 and 5 Volts depending on the amount of pressure applied to the sensor. Output modules respond to the signal line by representing the voltage in light, sound, display, movement, or other forms. In some embodiments, the pressure sensor scales the input signal in proportion to the pressure at the sensor, and passes that scaled signal to the output. Output modules transform or transduce incoming signal information into perceivable actions, such as light, sound, motion, or other perceivable actions.

All modules can be pre-assembled, pre-engineered, and contain the logic and circuitry used to make the module readily usable. For example, an LED module can contain a resistor corresponding to its current rating, an Operation Amplifier (OpAmp) as a buffer from the remainder of the circuit, or any other conceivable electronic circuitry. In another example, a coin cell battery module can incorporate a discharge protection circuit. In some exemplary embodiments, the system does not require any hardware or software platform. In other exemplary embodiments, the system may include a hardware and/or software platform. In some embodiments, the modules can be programmed. In some embodiments, the modules do not need to be programmed and do not require a central circuit controlling them. In such embodiments, the system can be standalone and does not need a computer or hub. In some embodiments, however, the system may be connected to an external electronic device such as a computer, tablet, hub, memory storage, or personal electronic mobile device, such as, for example, a cellular phone, smart phone, etc., to access or produce additional functionality or to retrieve information or power from the device.

In some embodiments, an electronic building system as described herein can include logic and state modules that can be used for programming Such modules can enable a user to program certain behaviors of his/her designed system without needing to learn a programming language, to write code on a computer, or to program a microcontroller circuit. For example, programming can be done through using logic modules to produce decision trees. In some embodiments, microcontroller programming can be done on the system. Also, a module can include feature controls, such as, for example, switches, knobs and buttons that enable selection of modes of behavior. Some modules can allow for the selection of a mode or adjustment of their behavior. For instance, a proximity sensor module can contain a mode switch and a potentiometer. Through the manipulation of the embedded potentiometer, the threshold level can be set, determining the input signal level beyond which the module should output a high. Also, by, for example, flipping a switch, the module can go from normally-high to normally-low, in essence inverting its response to the desired threshold. In some embodiments, this functionality can be implemented in software as well.

In some embodiments, a system as described herein can provide and include multiple electrical modules selectively couplable together to transmit electrical current from one electrical module to another electrical module, each module having at least one functionality associated therewith and including a connector adapted to couple to a connector of another electrical module. When the modules are coupled together (e.g., via the connectors), a functionality of at least one of the electrical modules can be dependent upon at least another one of the electrical modules.

In some embodiments, a system can include one or more modules that can communicate with one another via a wireless communication protocol (e.g., Bluetooth® radios). In other words, one or more modules can communicate with each other without being mechanically coupled together.

In some embodiments, a system as described herein can include at least four different categories of modules: power; input; output; and wire; although more types of modules are possible. Power modules provide electricity to the system. Input modules can interpret data or their surroundings and provide that input to the system. Output modules can make visual, physical, or audible changes to their surroundings based on input(s) to the system. Thus, the output modules can produce perceivable sensory or physical events. Wire modules can route power and/or communication between the modules in the system. Wire modules can also modify the electrical signals.

Many different types of modules are possible in each category, including but not limited to the following: (i) power modules, including for example, wall power modules, battery power modules, solar power modules, discharge protection circuits; (ii) input modules, including for example, pulse modules, pressure sensor modules, proximity modules, input recording modules, potentiometer modules, button modules, temperature modules, accelerometer modules, memory modules, timer modules; (iii) output modules, including, for example, motion modules, motor modules, vibration motor modules, fan modules, RGB LED modules, LED modules, bar graph modules, speaker modules, electroluminescent wire modules and display modules such as organic light emitting diodes (OLED) modules, or liquid crystal display (LCD) modules; and (iv) logic modules, including, for example, wire modules of various lengths, extender modules, splitter modules, programmable microcontroller unit (MCU) modules, and interface modules. Any known type of circuit or electronic component or combination of components may be used to create a module and thus form a portion of a system built using such components.

In some embodiments, when a first power module is connected to a second module, the power signal from the power module is transferred from the power module to the second module. Accordingly, the second module is powered by the first module. If, for example, a button module, sensor module, or other type of module is placed somewhere between the first power module and a second module, the signal or current may be affected by the action of the button module or the sensor module. For example, the signal or current may not pass (or, alternatively, may continuously pass) from the first module (power module) to the second module unless the button on the button module is depressed or the sensor on the sensor module is activated. Similarly, if a sensor module is only partially activated, then only partial current is transferred from the first module (power module) to the second module.

The modules described herein may be provided as individual modules or provided as part of a set or kit. A kit can include, for example, standard module components as well as specialized components such as sensor sets, mechanical sets, biological sets, sound sets, etc.

According to some embodiments, a kit that can include at least a portion of a building block system having multiple modules as well other supporting components, such as, for example, accessory components to allow a user to build a particular electronic device, such as, for example, a lamp, a toy vehicle, a light switch dimmer, etc. In some embodiments a kit may include one or more different category of modules (power, input, output, and/or wire), one or more different types of each category of modules, a container in which to store the modules, a mounting board or substrate upon which to place or couple modules, learning materials, accessories, instructions, or a variety of other components. For example, a kit may include multiple modules that may be connected in an almost unlimited number of combinations to perform numerous different input and output functions. In other exemplary embodiments, the kit may also include a limited number of modules that are intended to be assembled in a limited number of combinations, including a single combination, to perform a limited number of functions. For example, for a kit intended to be used to build a particular functional system, the kit can include as many as tens or hundreds or more modules, or it can include just two modules (a power module and an output module). In some embodiments, a kit may include modules and components intended to augment an existing module library or existing kit, in which case it may include just one type of module, such as, for example, a kit of only wire modules or only output modules. A kit may also be directed to a certain age group, with a kit for an elementary level including fewer and/or less complicated modules than a kit designed for a high school level, for example. In some embodiments, a kit may include instructions, videos, or other means, which inform the user as to one or more possible combinations of the modules. For example, the instructions may instruct the user how to assemble the modules into a battery-powered motion sensor that emits an audible alarm upon detection of movement.

In some embodiments, a system can be adapted to give access to sophisticated devices through, for example, analog, digital, or other interfaces. Example complex devices may include, but are not limited to, LCD displays, OLED screens, timers, accelerometers, logic gates, and many more. In some embodiments, this may be accomplished by pre-engineering one or more modules and providing "entry points" into the devices. The entry points can be, for example, knobs or switches that allow the user to adjust the intensity or frequency of pulsing, change modes of operation, set thresholds, make decisions, or remember a configuration, among many other operations. These may be considered "entry points" because they are based on similar devices that people know how to use from their everyday lives. The example modular systems described herein may take lessons and iconography from consumer electronics (such as, for example, blenders, DVD players, alarm clocks, game consoles) and apply them to these semi-raw electronic modules.

An example entry point module may include an OLED screen module, which includes an SD card slot in which users can insert an SD card preloaded with images and video. Images and videos may also be provided by a connected edge-router module and sent to another module via a digital communication protocol. The OLED screen module may also include a microcontroller on-board, which is pre-programmed with firmware to access and display the images. In some embodiments, also integrated in the OLED screen module may be a toggle switch and a knob, where the toggle switch selects between fixed images/video or looping and the knob adjusts the looping speed. In the above example, even though the circuit board and firmware itself may be complex, the end result will be an easy-to-use OLED screen module with appropriate iconography that may be accessible to children and novice users alike. The exemplary system may allow for and include the pre-engineering and design of numerous other complex modules similar to the OLED screen example.

Referring now to the figures, FIG. 1A is a schematic illustration of an example modular electronic building block system 100 that can include the network management or coordinator functions described herein and in more detail below with reference to FIGS. 4-24. It should be understood that the network management functions described herein can be incorporated within other modular electronic building systems. FIG. 1A also shows a schematic representation of a computer device 140 to which the modular electronic building block system can be electrically connected via a wireless (Wifi®, Bluetooth®) or wired connection (e.g., USB) and can communicate with other services and content on the Internet. FIGS. 1B-1E each illustrate an example of a different module 120, and FIG. 1F illustrates three modules (120-1, 120-2, 120-3) of FIGS. 1B-1D coupled together.

The modular electronic building block system 100 (also referred to herein as "system", "block system" or "electronic building block system" or "electronic building system") can include one or more electronic modules 120 (also referred to herein as "modules," "blocks," or "electronic blocks") that can each be removably coupled to at least one other module 120. FIG. 1A illustrates two modules 120. Each module 120 can include a printed circuit board 122 (also referred to as "PCB" or "circuit board") coupled to one or more connectors or connector portions, such as connectors 124 and 126, shown in FIG. 1A. In some embodiments, a module 120 may have only a single connector 124, 126. The circuit board 122 can include various associated electronic or electrical components to perform various desired functions, and include at least two interfaces (e.g., an input interface and an output interface). In some embodiments, the circuit board 122 can include, for example, two input interfaces and two output interfaces. Although the circuit board 122 is shown having a particular length and width, it should be understood that the circuit board 122 can have different lengths and widths than the example embodiments shown and described. It should also be understood that although the circuit board 122 is shown as being rectangular, the circuit board 122 can alternatively be a variety of different shapes, e.g., square, triangular, etc.

The connectors (also referred to herein as connector portions) 124 and 126 can each include a housing or housing portion 128 that can be fixedly or permanently coupled to the circuit board 122 with, for example, a mechanical fastener (e.g., bolt, screw, rivet, etc.). In other embodiments, the connectors can be coupled to the circuit board with a friction fit, and in yet other embodiments, the connectors can be coupled to the circuit board with a spring-loaded mechanism.

In some embodiments, a module 120 can include a single housing structure that includes the housings or housing portions 128 for each connector 124, 126 and a base portion between the housing portions 128. In other words, the housings 128 for each connector 124, 126 are monolithically formed as a single component. In some embodiments, such a housing structure can define in part an interior region or volume, in which components of the module 120 can be disposed such as circuitry and other electrical hardware.

In some embodiments, the modules 120 can include magnets to couple the modules 120 together. For example, the housing 128 can define one or more receptacles (not shown in FIG. 1A) that can receive therein a magnet that can be used to removably couple a connector (e.g., 124) of one module 120 to a connector (e.g., 126) of another module 120 as described in more detail below. The receptacles can have an open end at a top surface portion of the housing 128 and a closed bottom end. Thus, when a magnet is disposed within the receptacle, the magnet can rest on a bottom surface at the closed end of the receptacle. In other embodiments, one or more magnets can be disposed on an exterior of the housing or can otherwise be supported by the housing.

In some embodiments, the connectors (e.g., 124, 126) of a module 120 can alternatively or in addition also include an interlocking coupling mechanism (not shown in FIGS. 1A-1F) that includes at least one protrusion and at least one recess defined by the housing 128 that can interlock, mate, or complimentarily fit with at least one recess and at least one protrusion, respectively, of another connector of another module 120.

The modules 120 further include one or more contacts or conductors or one or more contact assemblies to provide for electrical connection between the modules. For example, a module 120 can include a first contact assembly (not shown in FIGS. 1A-1F) that can be coupled to or supported by the connector 124 and a second contact assembly (not shown in FIGS. 1A-1F) that can be coupled to or supported by the connector 126. In some embodiments, the first contact assembly and the second contact assembly can each include a base with multiple electrical contacts or conductors coupled to the base. For example, in some embodiments, the first contact assembly and the second contact assembly can each have from 2-15 contacts, or any suitable number of contacts. The first contact assembly can have the same or different number of contacts as the second contact assembly. The electrical contacts or conductors can be, for example, spring probes or small metal plate. In some embodiments, the electrical contacts can be coupled to the base with soldering; in other embodiments, the electrical contacts can be coupled to the base without soldering, with for example, mechanical couplings or by engagement of the contacts with the base. Further, in some embodiments, the first contact assembly can be permanently connected to the connector 124 and to the circuit board 122 without the use of a solder connection between contacts of the contact assembly and the circuit board 122 or housing 128 of the connector 124. Similarly, the second contact assembly can be permanently connected to the connector 126 and to the circuit board 122 without the use of a solder connection between contacts of the contact assembly and the circuit board 122 or housing 128 of the connector 126. For example, the contact assemblies can be sandwiched at least partially between the housing 128 of the connectors 124, 126 and the circuit board 122 when the circuit board 122 is coupled to the housings 128 with mechanical fasteners. In some embodiments, the circuit board 122 is permanently or fixedly coupled to the housings 128 of the connectors 124, 126 such that the contact assemblies are maintained permanently or fixedly coupled to the connector 124, 126 with a pressure fit.

When the first contact assembly is coupled to the connector 124, and the circuit board 122 is coupled to the connector 124, a portion of the first contact assembly extends outwardly from a front surface of the connector 124 and a front surface of the circuit board 122. When the second contact assembly is coupled to the connector 126, and the circuit board 122 is coupled to the connector 126, a portion of the second contact assembly extends outwardly from a portion of the circuit board 122. When a first module 120 is removably coupled to a second module 120, the first contact assembly of the first module 120 can be electrically coupled to a second contact assembly of the second module 120 and the contacts of the first contact assembly of the first module engage the contacts of the second contact assembly to electrically couple the first module to the second module.

Thus, the modules 120 can be mechanically and removably coupled together by a variety of different coupling methods including, for example interlocking coupling mechanisms, magnets, protrusions and recesses, etc. The modules 120 can be electrically coupled together through the coupling of contacts or contact assemblies of the modules 120.

As described above, the circuit board 122 can include an input interface and an output interface, and the circuit board 122 can be coupled to the connectors 124 and 126 such that one of the connectors 124, 126 is near the input interface of the circuit board 122, and the other connector 124, 126 is near the output interface. Thus, for example, when a first module 120 is coupled to a second module 120, the connector near the output interface of the first module 120 can be coupled to a connector near the input interface of the second module 120 such that electrical current can be carried or transferred from the first module 120 to the second module 120 via the contact assembly, and transferred to a third module 120 coupled to the second module 120 via the input interface of the second module to the output interface of the second module 120 and then to the input interface of the third module 120.

The modules 120 can also be used, or interconnected with, components of a different interlocking building block system, such as blocks B in FIG. 1A. For example, each module 120 can be coupled to a component or block B of a LEGO® block system. More specifically, each connector 124, 126 can include one or more mounting portions 130 (e.g., see FIGS. 1B-1E) that can matingly couple to such a component or block B of a different building block system. As shown in FIGS. 1B-1E, the mounting portions 130 extend from a bottom portion of the connectors 124, 126 such that the module 120 can be removably coupled to a top portion of a component B. In addition, in some embodiments, as shown in FIG. 1E, a module 120 can include additional adapters 164 and 166 coupled to a top surface of the circuit board 122 such that the module 120 can be coupled to a bottom portion of a component B of a different interlocking building block system. The adapters 164, 166 can be configured to couple the module 120 to a component B of the same interlocking building block system as the mounting portions 130 and/or to a component B of a different interlocking building block system than the mounting portions 130. Further details of such mounting portions 130 and adapters 164 and 166 are described below with reference to module 320.

Each module 120 can also include one or more electrical or electronic components 135 that can perform a particular function. Example electrical components 135 can include, power components (e.g., various type of batteries, power adapters), sensors (e.g., pressure, temperature), switches, push buttons, knobs, potentiometers, mode switches, tactile switches, timers, speakers, and other audio related components, visual components such as light components (e.g., light emitting diodes (LEDs)), recorders, motors, fans, thermometers, etc. In some embodiments, a module 120 can include, for example, a processor, micro-processor, controller, micro-controller, firmware, or a display such as a digital display. The various electrical or electronic components can be coupled (e.g., soldered) to the circuit board 122 of a module 120. Electrical power can be provided to the electrical components 135 via a power module (described below) and via the contacts or contact assemblies and circuit boards 122 of the modules 120 as described above.

As described above, various categories and types of modules 120 can also be referred to by the particular functionality the module provides. For example, a power module, a light module, a sensor module, a switch module, etc. As described above, in some embodiments, a system 100 can include at least four different categories of modules: power; input; output; and logic; although more types of modules are possible. Power modules provide electricity to the system. Input modules can interpret data or their surroundings and provide that input to the system. Output modules can make visual, physical, or audible changes to their surroundings based on signals present in the system. Wire modules can route or modify power, signals and/or communications between the modules in the system and/or interface with other systems, such as, e.g., the MIDI protocol, a digital display, dot matrix display or video display.

In one example, a power module 120 provides power components and can take current from a battery, an AC adapter (e.g., wall wart), or AC to DC converter, or other power source, and convert it into current, feeding the other components of the system (e.g., other electrical components of the modules coupled to the power module). Thus, in any working configuration of modules (e.g., multiple modules removably coupled together to create a desired functionality), there is typically at least one power module to supply power to the desired system. In some embodiments, some or all of the modules can include a power source. An example power module 120 is shown in the schematic illustration of FIG. 1B and can include, a power adapter 127 with a cord 123 that can be releasably coupled to a power source PS (shown in FIG. 1A). In other embodiments, a power module can include a battery block that can receive one or more batteries, a coin battery, a rechargeable battery (e.g., Lithium-Ion (L-Ion) battery or Lithium Polymer (LiPo) battery), or other type of power source within the power module itself. In some embodiments, a power module can include a battery charger, a USB port, and/or a Bluetooth® or other type of component to provide wireless capabilities.

FIG. 1C illustrates another example module. A tactile switch module 120 can include a push button 129 (or other type of switch) that can be coupled (e.g., soldered) onto the circuit board 122 as shown in FIG. 1C. As described above, the circuit board 122 can have an input interface and an output interface. The tactile switch module can have, for example, a connector 126 near the input interface and a connector 124 near the output interface. The connector 126 of the tactile switch module 120 can be designed to couple with a connector near an output interface of another module 120, and the connector 124 of the tactile switch module 120 can be designed to couple to a connector near the input interface of a different module. The tactile switch module 120 can include electrical conductors designed to complete connections between two engaging interfaces for a power line and a ground line. A signal line can go through the push button 129, which makes or breaks the circuit, and thus transfers a modified signal line to the output interface corresponding to the module function.

In another example, a light emitting diode (LED) module 120 is shown in the schematic illustration of FIG. 1D. The LED module can include, for example, an LED component 131 (e.g., a dip package LED component) coupled (e.g., soldered) to the circuit board 122. In yet another example, a sound generator module 120 is shown in FIG. 1E, and can include a speaker, alarm, buzzer, or other sound emitting component 161. When, for example, the power module of FIG. 1B is coupled to the tactile switch module of FIG. 1C and the tactile switch module is coupled to the LED module as shown in FIG. 1E, and the power module is connected to a power source, when a user pushes the push button of the switch module, a circuit is completed and the LED illuminates. The power module adapter 127 delivers power to the power module and the pre-integrated circuitry in the power module then converts the voltage to a desired voltage such as, for example, 5 Volts in the present example. If the tactile switch module is removed from between the two other modules, the LED module can be coupled directly to the power module, constant power will be delivered to the LED module and the LED will remain illuminated until the power is terminated. In the above-described example, there is one power module, one input module (the tactile switch module) and one output module (the LED module). It should be understood that this is merely one example of the various types of modules that can be coupled together to achieve a particular functionality. In other examples, the LED module could be replaced with an audio module (e.g., a buzzer module) so that when the push button of the tactile switch module is pressed, the audio module makes an audible sound (a buzzer). Many other combinations and sub-combinations are possible with different modules having different functionality all forming different circuits, with immediate response of the elements, and without any need for programming, soldering or circuit assembly.

In some embodiments, input (e.g., user input) need not be limited to just a mechanical input device (e.g., a mechanical switch) but also can be digital input. For example, in some embodiments, a module can have a wireless receiver, and in such an embodiment, a user can use a processor with a wireless transmitter to send a wireless signal to make an input.

In another example module (not shown), a power module can include a battery component, such as, for example, a coin cell battery block. The coin battery can deliver a little over 3 Volts stepped up to 5 Volts by the electronic circuit of the module. The circuit can also include a discharge protection circuit, which demonstrates an example of how the electronic building system can be designed to make the system easier to use and safe for users. The circuit may also include an embedded switch that enables a user to turn on or off the battery component so as not to waste battery power. Connected to the battery module can be a pressure sensor module, which can read the amount of pressure applied to a pressure sensor component and output voltage in the range of, for example, 0 to 5 Volts depending on the amount of pressure applied. As more pressure is applied to the pressure sensor component, higher voltage transmits to the next modules. In this example, the next modules can be, for example, a vibrating motor module and an LED module, which respectively vibrate more and illuminate brighter as the applied pressure increases. It should be understood that the above example of 0-5 Volts is merely an example, and that other voltage ranges can be used to accomplish the electronic functions described.

In some embodiments, each module 120 can include control and protection circuitry to facilitate safe and easy operation of the module 120. In some embodiments, each module 120 can include an operational amplifier component or other electronic circuits used in a buffer configuration to reduce the amount of overall current consumption on the overall system of coupled modules 120. This assists with facilitating the cascading of multiple modules 120 without significant loss of power, as well as scaling the system as may be desired. In other exemplary embodiments, the system 100 may include a booster module in the overall system of coupled modules to boost the current and/or power traveling through the power lines and ensure proper functioning of all the modules 120 in the system 100.

In another example, a user can program behavior of a circuit by manipulating physical elements. In an example embodiment, a power module can include a 9 Volt battery, which module can be coupled to a temperature sensor module that includes a threshold component, and the temperature sensor module can be coupled to an audio module. In this example, the temperature sensor module may be more advanced than a traditional sensor module and can include a temperature sensor and a potentiometer that may be adjusted to set a temperature threshold. If the temperature detected by the temperature sensor is above the set temperature threshold, the temperature sensor module outputs a high reading. This is an example of integrating logic with a simpler analog module to enable complex circuit configurations. An output of a high reading from the temperature sensor module will cause the audio module to activate and a speaker on the audio module to play a pre-recorded message associated with a high reading. For example, this exemplary circuit could be used by a person wishing to have an alarm to turn on the air conditioning. When the temperature exceeds a pre-set threshold temperature, the audio module could play back a message "time to turn on the AC!" Also, the audio module may instead be replaced with, for example, a fan module, which may activate a fan upon receiving a high temperature reading signal from the temperature sensor module.

In some embodiments, the temperature sensor module may incorporate a mode switch that can change the behavior of the module from 'normally-low' to 'normally-high'. In contrast to the above described configuration (which was normally-low), a 'normally-high' setting would cause the temperature module to output a high reading except when the temperature exceeds the threshold. This means the audio module would be playing recurrently until the room gets warmer, at which point the audio module will cease to output audio. These controls, in addition to pre-programmed modules, logic modules and state modules, can allow the system to enable complex prototypes and circuits with no programming or electronics knowledge.

Each module 120 of a system 100 may also be uniquely configured to provide a quick visual indication to a user of each module's function. The modules 120 may be uniquely configured in any manner and have any characteristic to identify the functionality of the modules. Additionally, any portion of the module 120 may be uniquely configured and have any characteristic to represent the unique configuration feature. For example, the modules may have a characteristic that uniquely identifies the modules by color-coding, patterning, or may include unique structuring such as shapes, housings, interconnection or couplings, etc. In one example, the connectors of a module can be color-coded as the manner of uniquely configuring modules to provide visual indicators as to the function of the modules. In other examples, the module can include color-coded fasteners to identify a particular type or category of module, or a module can include an indicator component coupled to the circuit board and/or one or both of the connectors to identify a particular type or category of module. It should be understood that the color-coding examples provided are merely examples and not intended to be limiting, as the modules 120 may be uniquely configured in any manner. Color-coding of the modules can provide a user with a quick visual confirmation of the type of module, the functionality of the module, as well as allowing the user to learn which color combinations are possible. The functionality of the modules identified by the unique configurations and characteristics may be any type or level of functionality. For example, the unique configurations may indicate that the modules are input modules, power modules, wire modules, output modules, etc. In other examples, the unique configurations of the modules may be more specific such as, for example, an LED module, a 9-volt battery module, a cell battery module, a potentiometer module, a switch module, a pressure sensor module, a pulse module, a button module, a vibration motor module, a wire module, etc.

Figure 2:
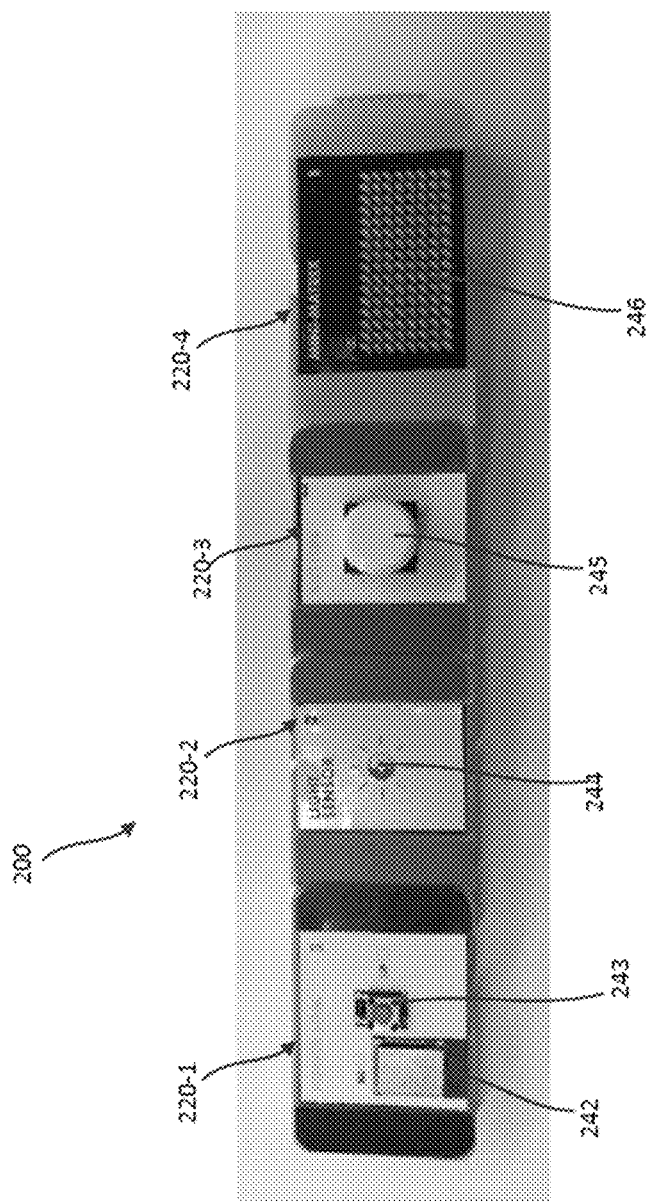
FIG. 2 is a top view illustrating four modules of an electronic building block system according to an embodiment, shown coupled together.

FIG. 2 illustrates four modules of a modular electronic building block system 200, according to another embodiment, shown coupled together. The modular electronic building block system 200 (also referred to herein as "system", "block system" or "electronic building block system" or "electronic building system") can include one or more electronic modules 220 (also referred to herein as "modules," "blocks," or "electronic blocks") that can each be removably coupled to at least one other module 220. The system 200 can include the system and network management functions described herein and in more detail below. The system 200 can also be electrically connected to a computer device 240 (see, e.g., FIG. 4) via a wireless (e.g., WiFi®, Bluetooth®) or wired connection (e.g., USB). The modules 220 of the system 200 can be mechanically and electrically coupled together in a variety of manners. For example, the modules can be mechanically and electrically coupled together as described above for system 100. The system can include all the same or similar features, components and functions as described above for system 100 and therefore, some features are not discussed in detail with respect to this embodiment.

Figure 3:
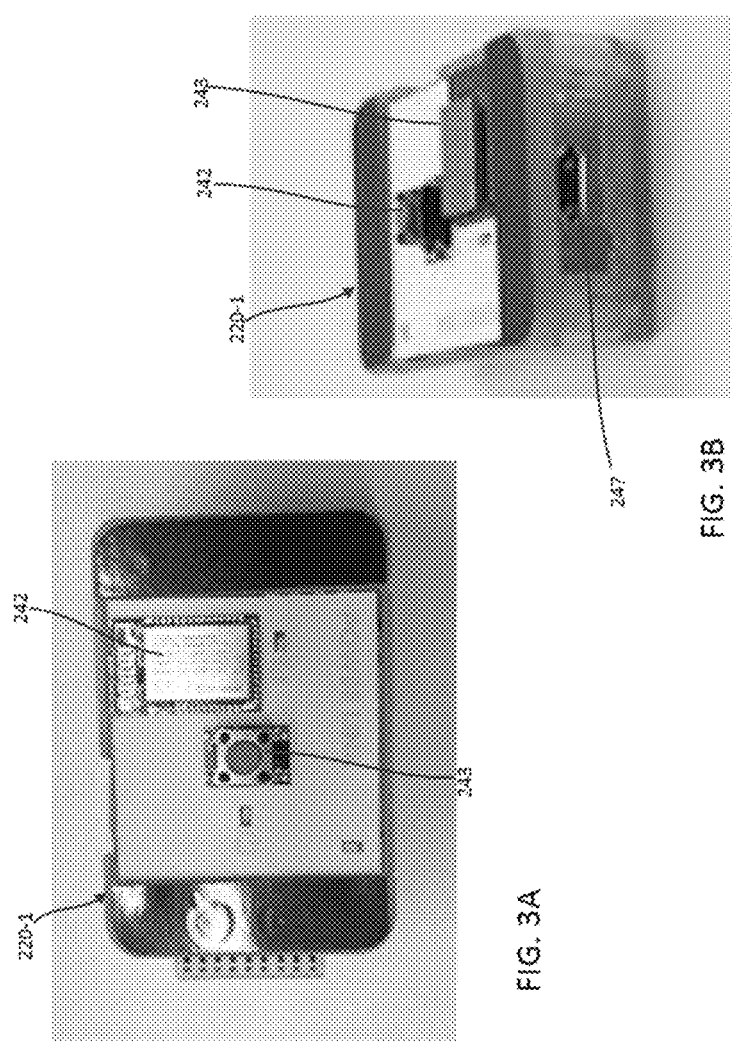
FIG. 3A is a top view of the power module of FIG. 2.
FIG. 3B is an end perspective view of the power module of FIG. 3A.

The modules shown in FIG. 2 include a power module 220-1, a light sensor module 220-2, a button module 220-3 and a mini-matrix module 220-4. FIGS. 3A and 3B are a top view and an end perspective view, respectively, of the power module 220-1. The power module 220-1 includes a Bluetooth® component 242, an on/off button 243 and a USB port 247 (shown in FIG. 3B). The light sensor module 220-2 includes a light sensor 244, the button module 220-3 includes a button 245 and the mini-matrix module 220-4 includes mini light components 246 (e.g., LEDs).

Figure 4:
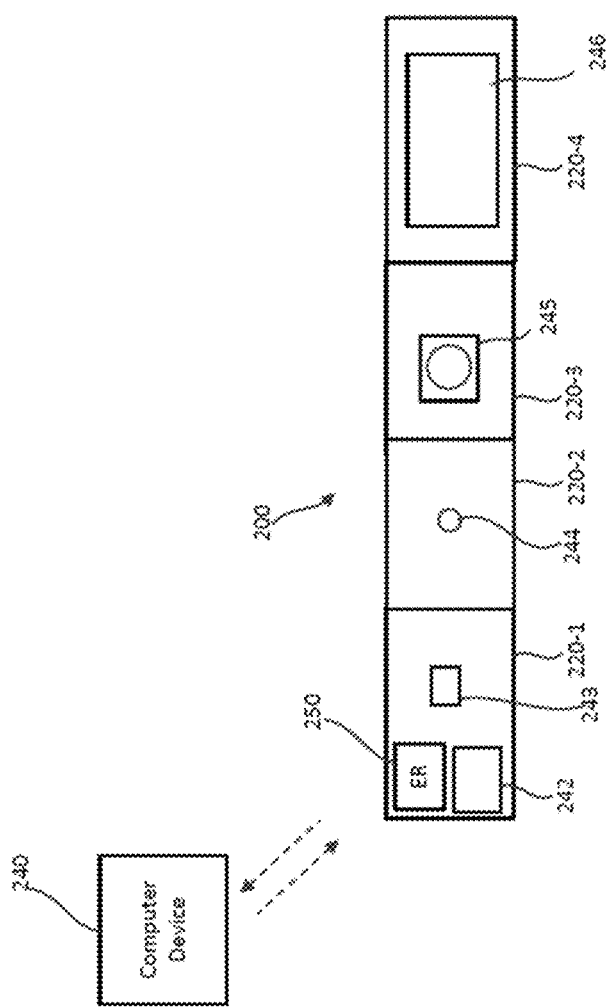
FIG. 4 is a schematic illustration of the modules of FIG. 2.

FIG. 4 illustrates a schematic representation of the four modules of an electronic building system (also referred to as a "system") shown and described above with respect to FIG. 2. In this embodiment, the power module 220-1 includes an edge-router (ER) and can be configured to perform the edge-router and network coordinator functionality described herein and in more detail below. The power module 220-1, via the edge-router can be in communication with a computer device 240 (e.g., a PC, tablet, phone) via a wireless or wired connection, and can receive commands from the computer device 240 and send those commands to modules upstream of the edge-router, such as modules 220-2, 220-3 and/or 220-4 in this example. The modules 220 can include any of the features and functions described herein for other modules and exclude other features and functions of other modules.

The network coordinator module (e.g., power module 220-1) can also perform topology detection (or discovery) functionality to define the paths and routes of communication between the modules of the bit-system. The topology detection functionality is described in more detail below with respect to FIGS. 22 and 23. A user of the system can write code or download code from another source using the computer device 240 to program and change the configuration of one or more modules of the assembled bit-system and this can be communicated to the bit-system via the edge-router module. For example, in the assembled/interconnected bit-system of FIG. 4, a power module 220-1 is coupled to a light sensor module 220-2, which is coupled to a button module 220-3, which is coupled to a mini-matrix module 220-4. In one example, the user can write code on the computer device 240 to cause the mini-matrix module 220-4 to flash three times when the light sensor is activated. Based on this new program code, the computer device 240 can send instructions to the edge-router in the power module 220-1, which can then interpret and send the instructions to the mini-matrix module 220-4. Based on the identified topology of the bit-system, the edge-router stores a routing table that identifies all the modules in the bit-system and can communicate with each module within the bit-system. The commands sent from the edge-router can bypass modules within the circuit and the commands can be sent to the module affected by the new coding. In other words, the commands pass through intervening modules, which do not interpret the commands, but instead pass the commands on once the address of the intervening modules does not match the address identified in the command.

FIGS. 5-22 illustrate various features and functions related to the system and network management functions that can be included in a modular electronic building block system such as, for example, systems 100 and 200 described above. The system and network management functions described herein can also be incorporated within other electronic building block systems.

As described above, a module of an electronic building block system can include, for example, a processor, microprocessor, controller, micro-controller, firmware, or a display such as a digital display. The various electrical or electronic components can be coupled (e.g., soldered) to the circuit boards of the modules of the system. The modules can include an electrical component that can perform a discrete function and electrical power can be provided to the electrical components via a power module via the contacts or contact assemblies and circuit boards of the modules. In some embodiments, input (e.g., user input) need not be limited to just a mechanical input device (e.g., a mechanical switch) but also can be digital input. For example, in some embodiments, a module can have a wireless receiver, and in such an embodiment, a user can use a processor with a wireless transmitter to send a wireless signal to make an input.

As also described above, a modular electronic building block system can be connected to and in communication with a computer device, such as a PC, tablet, phone, etc. A user of the system can then create a bit-system using the modules and create code to instruct the modules to perform certain functions.

Figure 6A:
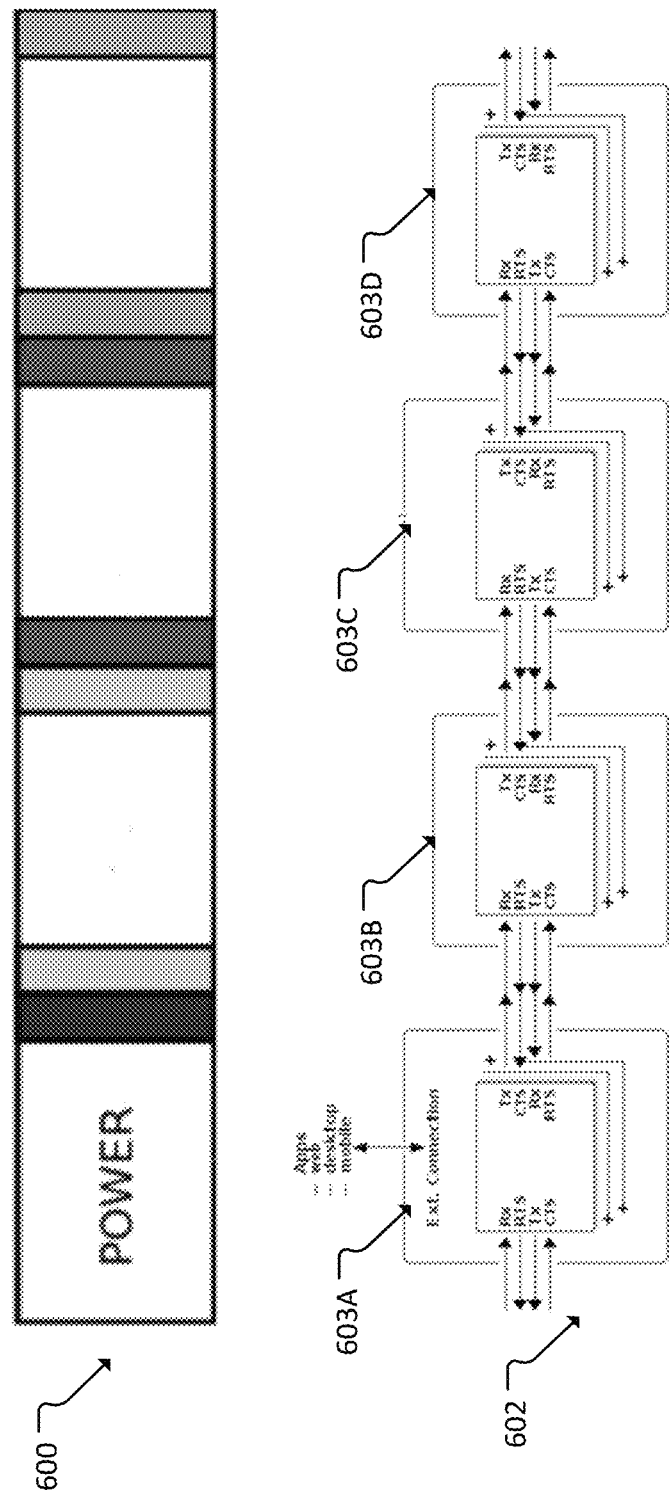
Figure 7:
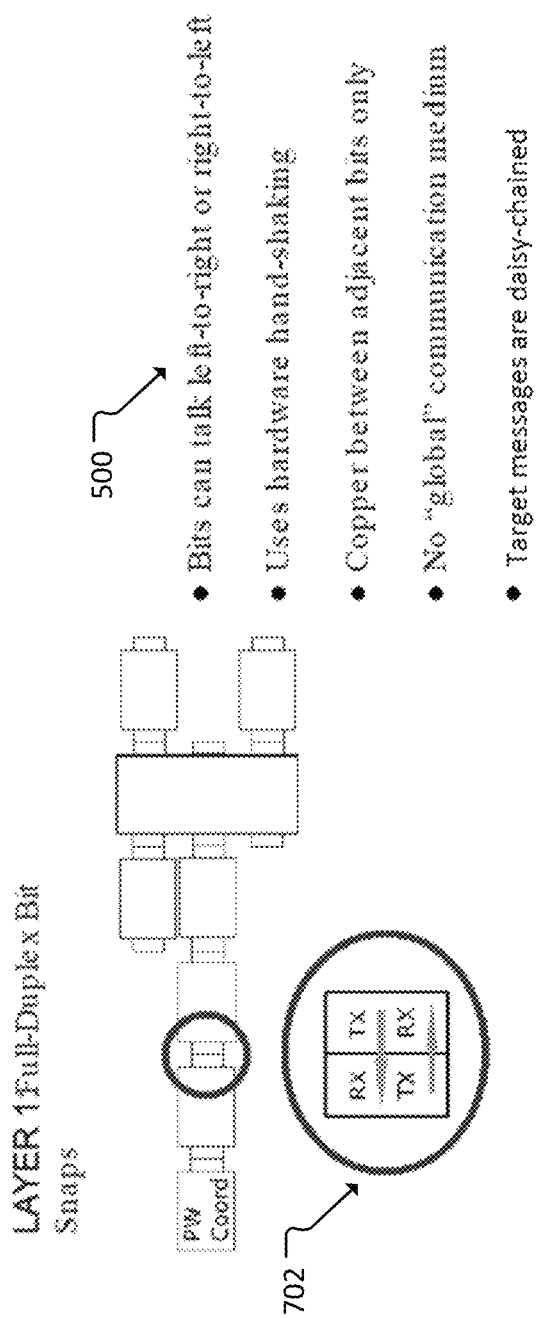
Figure 8:
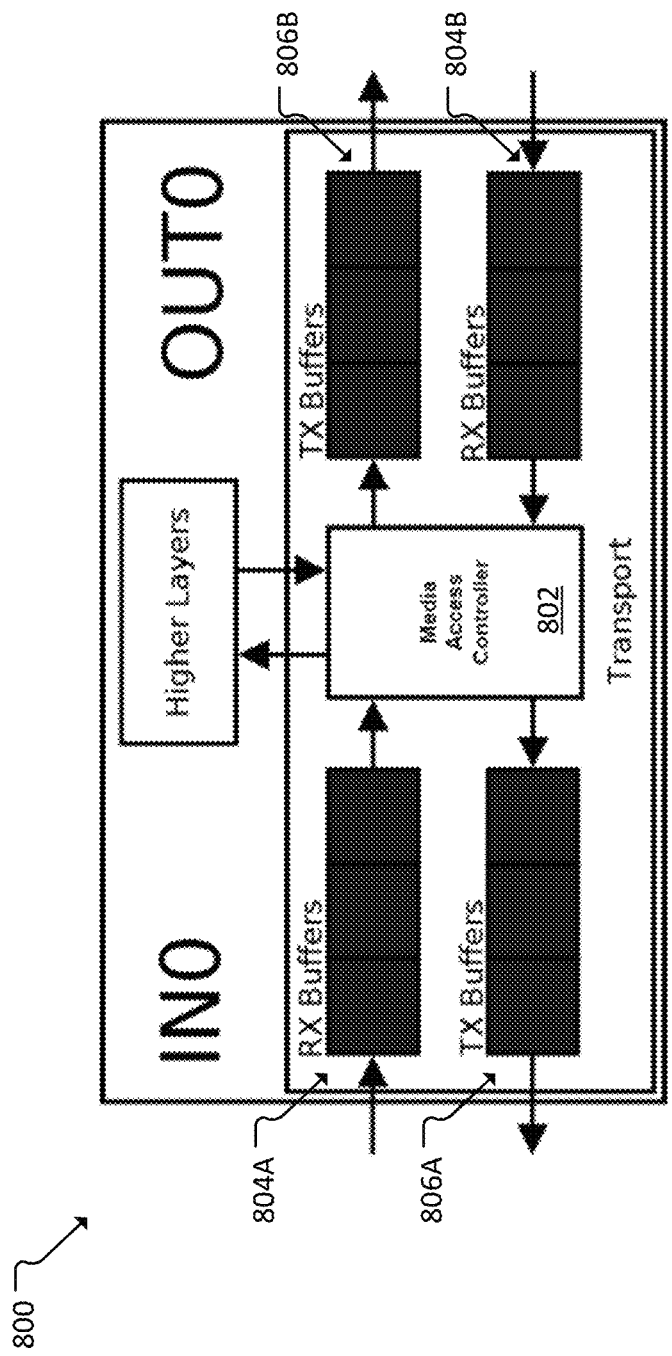

FIG. 5 illustrates a single module 500 of an electronic building block system and its associated communications hardware (e.g., Rx, Tx, RTS, CTS). FIG. 6A illustrates a schematic representation 600 of four modules (603A-D) of an electronic building block system (also referred to as a "system") such as system 200 shown in FIG. 4, and the communications hardware and connections between the modules. In some embodiments, each module in the system can include a processor. In some embodiments, only some of the modules of the system include a processor. Each module in the system can have bi-directional communications capabilities with adjacent modules within an assembled bit-system. The modules can store and forward data to other modules as illustrated in FIG. 6B. FIG. 6B illustrates communication going both down the chain 604A and up the chain 604B. At least one module can be connected to and communicate with an external computer device, such as, a PC, tablet, phone. FIG. 7 also provides a further illustration and description for the bi-directional communication between modules within a bit-system. In examples, bit communication can be performed in a direction al manner. For example the bits, also referred to as blocks herein, can communicate from left-to-right or right-to-left in a system chain. The bi-direction al communication is performed by communicating data using Rx and Tx buffers resident on each block, as shown in blown up connection 702. Hardware handshaking may be used to facilitate the communication between bits. Target messages passed through the system may be daisy-chained FIG. 8 is a schematic illustration 800 of the communications hardware within a module, according to an embodiment. As shown in FIG. 8, the modules include a media access controller (MAC) 802, Rx buffers (i.e., receiving buffers) 804A and 804B for incoming communications and Tx buffers (i.e., transmission buffers) 806A and 806B for outgoing communications. The buffers may reside in the memory of the individual blocks.

At least one module in the system can include an edge-router and a network coordinator function, which can manage the external connections and the network traffic and topology detection (or discovery) of a particular bit-system. As described above, a bit-system refers to a particular assembled/interconnected set of modules. FIGS. 6A-6B illustrate the power module 603A as including the edge-router and being in communication with an external computer device, however, it should be understood that other modules could include an edge-router and perform the edge-router and network coordinator functions described herein. In the descriptions below, we refer to the power module as including the edge-router and the network coordinator functions, and also refer to the power module as the edge-router module.

Figure 9:
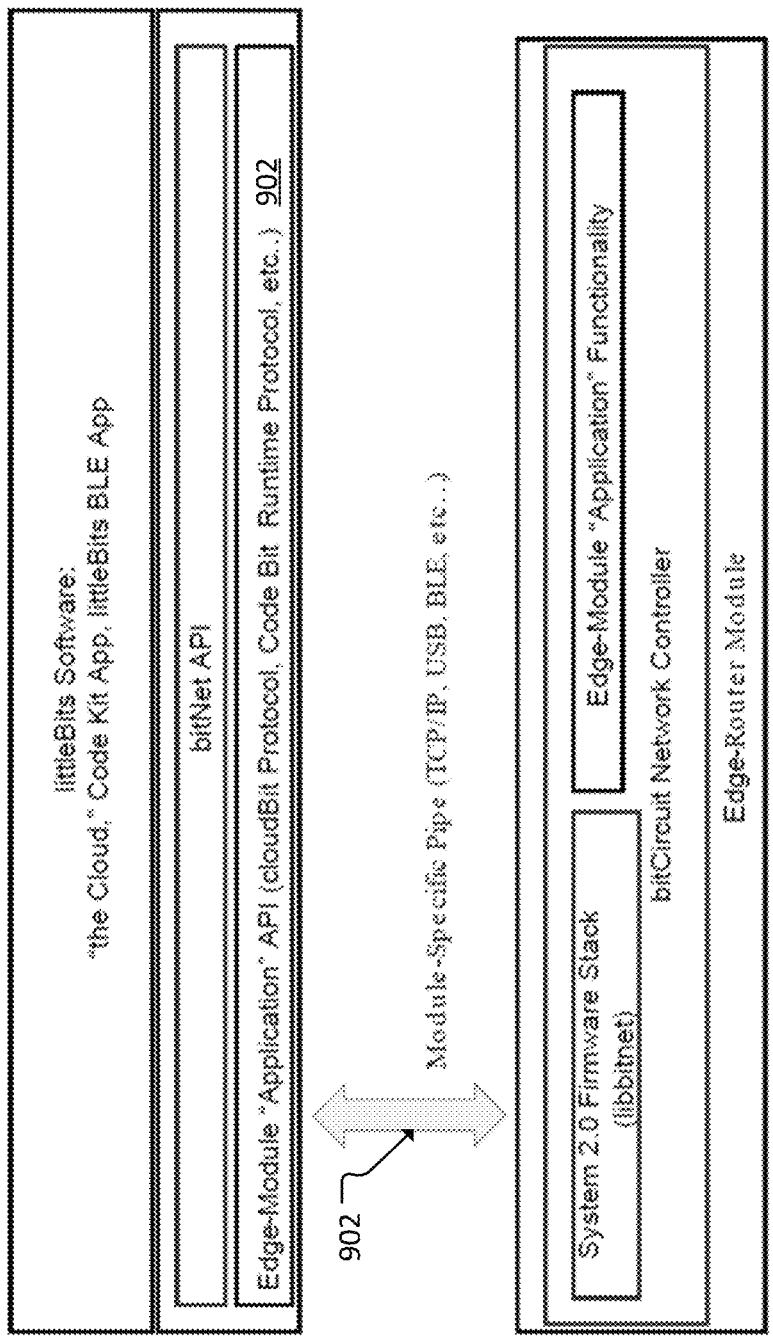

FIG. 9 is a schematic illustration of the communications between an external computer device (e.g., computer device 240 in FIG. 4) and the edge-router module (e.g., power module 220-1 in FIG. 4). The top portion illustrates the computer device that includes software running on hardware, and the bottom portion illustrates the edge-router module that includes hardware and firmware and/or software, with the arrow in-between representing the hardware-software connections between the computer device and the edge-router module. Software on the computer device can indirectly control and request data from downstream modules (downstream from the edge-router module) by issuing requests to the edge-router module. The edge-router module then interprets and forwards the request/response to the downstream modules. This can be done through a series of APIs, and most notably the field API 902 which may be resident on an external computing device. The edge module may communicate with the computer via a wired or wireless communication link 904 using a communication protocol (e.g., TcP/IP), USB, BLE, etc.).

Figure 10:
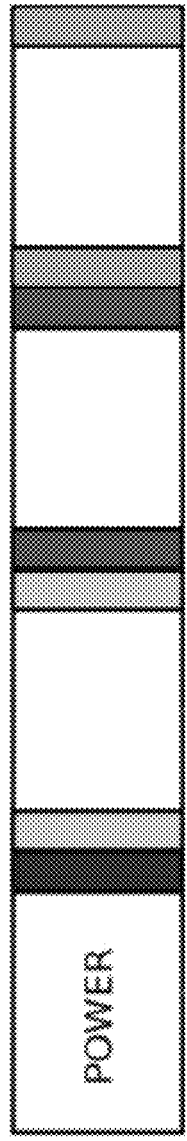
Figure 12:
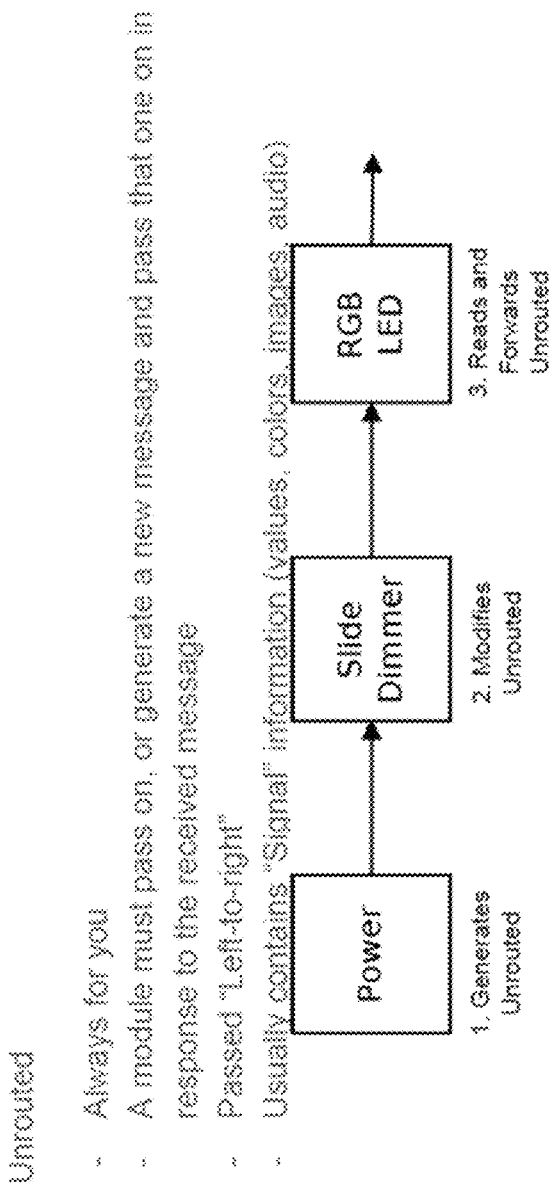

The modules within a bit-system are each a node and have a MAC as shown in FIG. 8, and can communicate routed and unrouted data between each other. FIGS. 10-18 are schematic illustrations and brief descriptions of how routed and unrouted data are passed through the modules of a bit-system. As shown in FIG. 10, the modules may forward routed data, may forward unrouted data, and may modify unrouted data (e.g., at an input module). The edge router node may perform network coordination. FIG. 11 illustrates a typical/generic message structure which includes a header region 1102 and a payload region 1104. In examples, the messages may be 132 bytes in length in accordance with hardware optimization. Alternatively, messages of different sizes may be employed using the embodiments disclosed herein. Unrouted messages can only be sent by the network coordinator module (in this example, the power module) and flow outwardly away from the network coordinator module, in this example, from left-to-right, as described in FIG. 12. The modules in the path of an unrouted message, but not the target module, pass the message on to the next module (in this example to the right, or generate a new message and pass that on to the next module (in this example to the right). Unrouted messages usually contain signal information, such as values, colors, images, audio. Such signals are sent after topology protocol discovery and are separate from the messages to reprogram modules.

Figure 13:
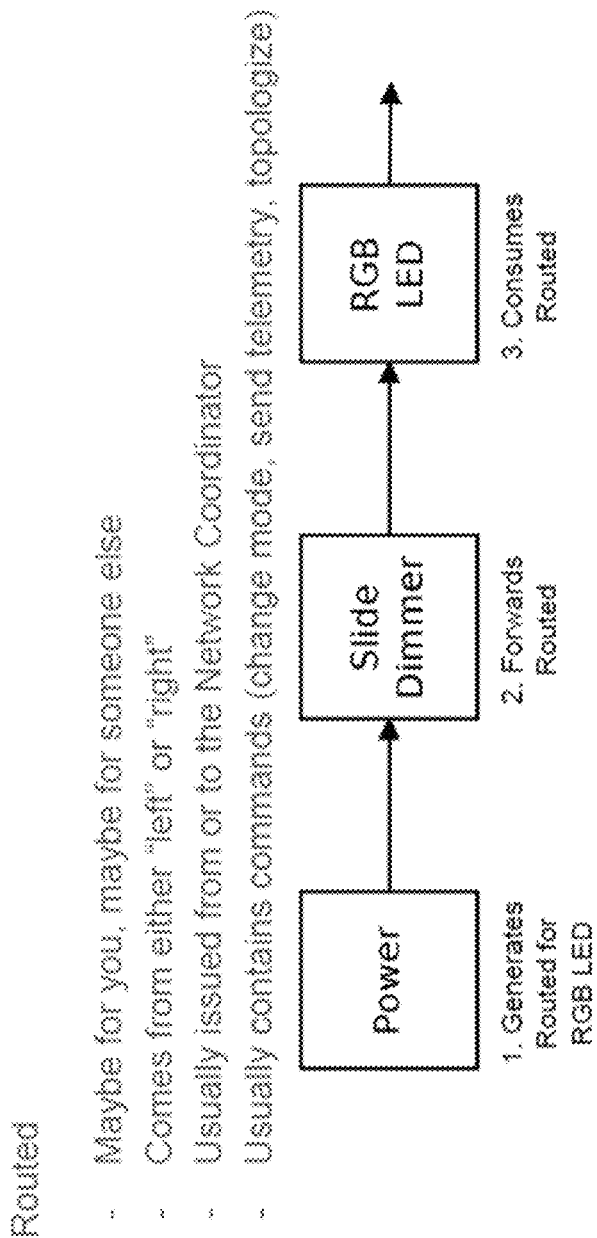

Routed messages are typically issued from or to the network coordinator and flow outwardly away or inwardly toward the network coordinator. In this example, the routed messages flow from left-to-right or from right-to-left. Routed messages usually contain commands (e.g., change mode, send telemetry). FIG. 13 illustrates a simple left-to-right message flow where the power module (network coordinator module) generated a routed message for the third module labeled RGB LED. The message flow is received at the second module labeled Slide Dimmer, which then forwards the message to the RGB LED module. In examples, the routed message may identify the intended recipient block using an address or an identifier. In such embodiments, other blocks receiving the message may forward the message to the next block if the message address or identifier does not match the block's address or identifier. Alternatively, the messages may include instructions for blocks other than the intended recipient to forward the message down the chain of blocks.

Figure 14:
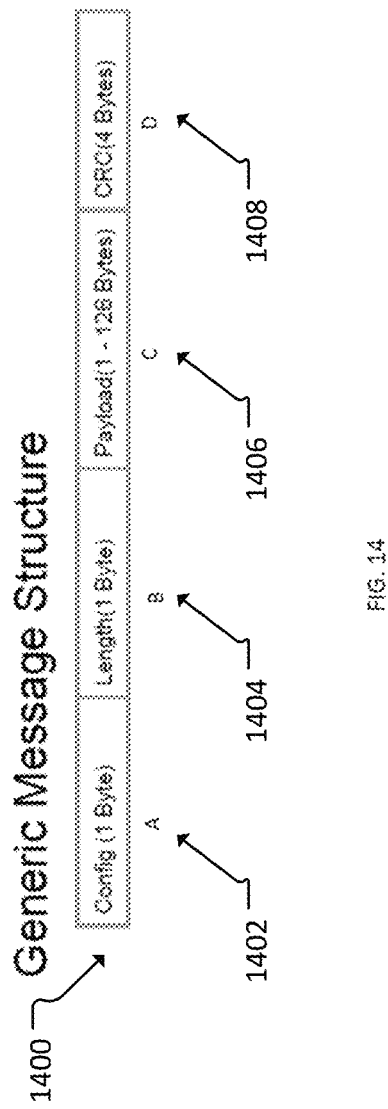
Figure 16:
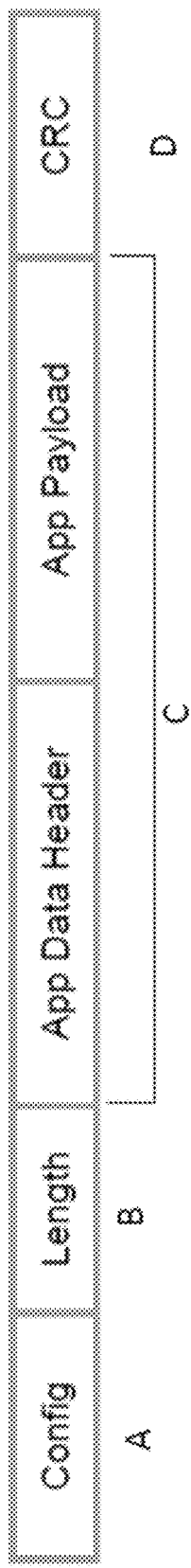
Figure 17:
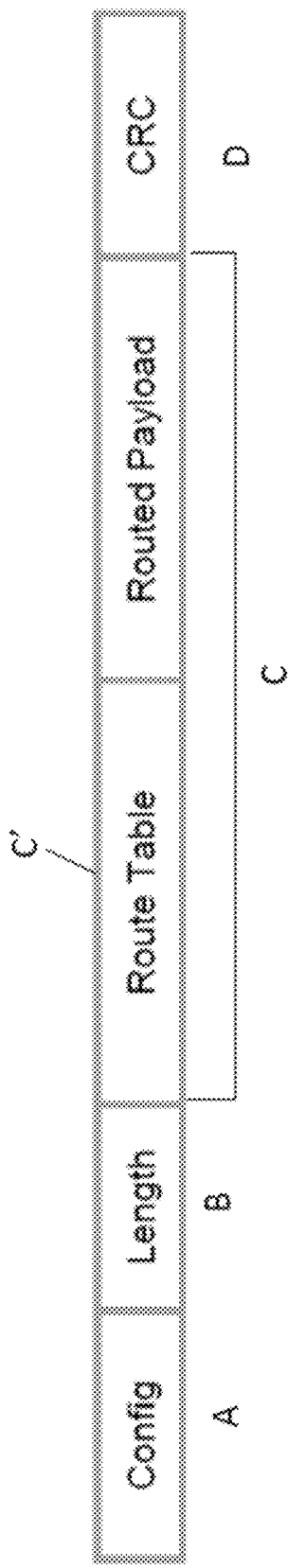

FIG. 14 illustrates a generic message structure 1400, FIG. 16 illustrates an unrouted message structure and FIG. 17 illustrates a routed message structure. As shown in FIG. 14, a generic message structure includes four parts, labeled, A 1402, B 1404, C 1406 and D 1408. FIG. 15 illustrates message parts A and B in more detail. Fro example, the message may include a configuration portion, an isRouted field that identifies the message as being routed or not, an isDirty field indicating whether there has been a change of buffer state for the message routing, an isTelemetry field indicating whether the message can be packed, and msgtype field indicating the type or destination of the message. While specific field sizes are depicted in FIG. 15, one of skill in the art will appreciate that other sizes may be used without departing from the scope of this disclosure. The corresponding message structure parts A, B, C and D of unrouted and routed messages are illustrated in FIGS. 16 and 17, respectively.

FIG. 18 illustrates an example route table C' from the routed message structure of FIG. 17. The route table remains static over the various hops (through the modules), and typically will be a subset of what is in the bitcircuit table generated by the network coordinator. The route table may include the number of blocks (i.e., bits) that the message must traverse, the current block or bit that the message is one, and a table defining the message path. During message transmission, the message may be forwarded by each block until the number of blocks required for transmission (i.e., the tableLen value) equals the number of blocks traversed (i.e., the tableIdx value). The values in the table are updated at each hop (e.g., at each hop of three hops for four modules in a circuit) until the number of bitsnaps (e.g., connectors) in the route (i.e., the tableLen) equals the current bitsnap (i.e., tableIdx). For example, if there are four bitsnaps in the route, once the 4$^{th}$ bitsnap is reached (tableIdx=4) then the destination is reached.

Figure 19:
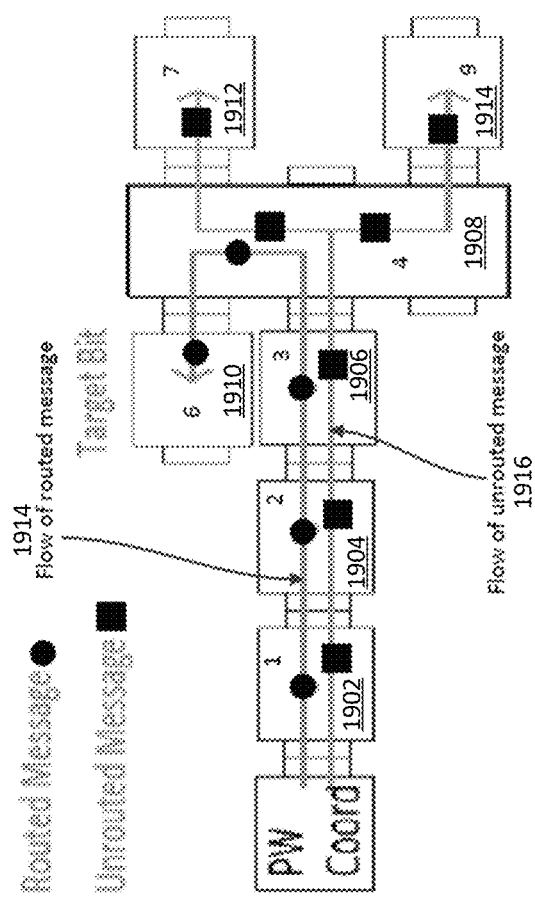

FIG. 19 provides a schematic illustration and description of the flow of communication between modules for routed 1916 and unrouted 1918 messages for a given assembled/interconnected bit-system. In this illustration, a bit-system is assembled that includes a power module that includes edge-router and network coordinator functionalities (labeled PW Coord), and seven modules labeled 1 1902, 2 1904, 3 1906, 4 1908, 6 1910, 7 1912 and 9 1914. As described above, unrouted messages 1918 can only flow in one direction outwardly from the edge-router module (e.g., from left-to-right in the example in FIG. 19), to the other modules to reach a target module. Thus, for unrouted messages 1918, the target module at which the unrouted messages 1918 are to be received, must be within a route/path such that the unrouted messages 1918 can flow through the modules in a single direction from the edge-router module (e.g., from left-to-right in the example of FIG. 19) until received at the target module. The routed messages 1916 can flow from left-to-right and right-to-left. For example, a routed message 1916 can be sent from the edge-router module (PW Coord) through modules 1, 2, 3 and 4 to the right of the edge-router module, and then back in the left direction to reach module 6, the target module (labeled Target Bit in FIG. 19).

Figure 20:
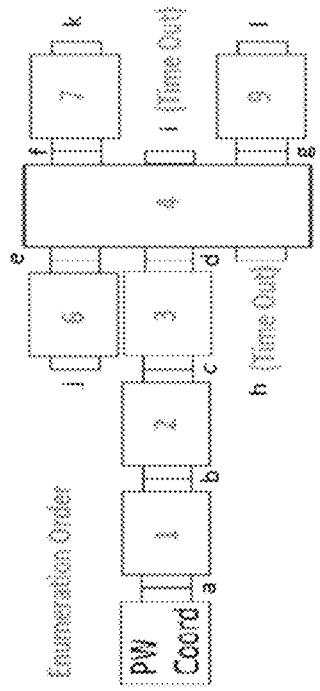

FIGS. 20 and 21 provide a schematic illustration of the bit-system of FIG. 19 and description for a topology detection method according to an embodiment. As described above, a module, such as the power module can include edge-router and network coordinator functionality Part of that functionality can include a topology detection process to identify all of the modules interconnected in a given bit-system.

More specifically, as described herein, the network coordinator and edge-router functionalities can be located within the power module (labeled "PW coord" in FIGS. 19 and 20). The power module is shown on the left with multiple other types of modules coupled thereto to create a bit-system. To determine the topology of the bit-system, the network coordinator (at the power module) first generates topology request messages sent out of each of the bitsnaps (e.g., connectors) of the power module (here the power module has one bitsnap/connector) to the module connected to that bitsnap of the power module. In the example in FIG. 20, the power module has a single bitsnap connection at "a" to a first module (labeled "1"). The first module ("module 1") will analyze the request (e.g., a processor in module 1) and respond by providing information about itself (e.g., functionality, type of module) and how many other bitsnap connectors it has. In this example, module 1 has one other bitsnap connector at "b" connected to a module 2 (labeled "2"). The network coordinator (e.g., at the power module in this example) then sends a topology request to the bitsnap connector at "b" which is received at module 2. The processor of module 2 will analyze the request and respond by providing information about itself and how many other bitsnap connectors it has. This process of sending topology requests and receiving a response(s) continues at each module until all of the modules and bitsnaps have been identified. Where a module has a bitsnap with no connected module (e.g., module 4 has two at "h" and "I"; module 6 has one at "j"; module 7 has one at "k"; and module 9 has one at "1"), the topology request to that bitsnap would time out with triggering a response, indicating no module is connected at that bitsnap. In some embodiments, after all modules have been identified, the network coordinator communicates the information to a computing device (e.g., PC, tablet) outside of the bit-system. In other words, after the edge-router has received all of the responses from the modules of the bit-system, the edge-router sends a single overall topology representation to the computer device. In some embodiments, the topology detection can be performed and after each response is received back at the edge-router from the modules of the bit-system, the edge-router can communicate the data to the computer device. The computer device can then generate a single/overall topology representation. The representation of the topology can then be used when subsequently sending routed data, for example, to instruct a module to change its configuration.

If the topology of a given bit-system changes, for example, a user adds or removes one or more modules of the bit-system, the topology is updated by the network coordinator/edge-router. In some embodiments, the topology is updated automatically by the network coordinator/edge router. The topology can be updated based on a set time period or at set intervals and/or can be updated upon receipt of a message at the network coordinator module from another module within a bit-system indicating a change has occurred. For example, in the bit-system of FIG. 20, if the user were to remove modules 7 and 9, the network coordinator/edge-router module would receive a signal from module 4 indicating that the bitsnap connections at "f" and "g" no longer have a module connected thereto. In some embodiments, the network coordinator/edge-router module can be configured to update at a set time interval, for example, every 5 seconds, to discover if a module(s) has been added or removed. In other words, the edge-router module sends topology requests messages to the other modules as described above at set intervals. In either case, the edge-router can then update the bitcircuit table and communicate the information to the computer device.

The topology detection functionality/method of network topology does not use an "address" as may be done in other systems, but instead generates a routing table ("bitcircuit table") that represents the positions of the modules within the identified topology relative to the network coordinator. The position of a given module within the bit-system is represented by an index into the bitcircuit table that is maintained by the network coordinator. For subsequent routed messages, the communication route to each module is defined by the paths through the bitsnaps identified for each module within the given bit-system. For example, as described above for FIG. 19, a routed message can be sent from the edge-router module (PW Coord) to a target module 6 and flow through modules 1, 2, 3 and 4 to the right of the edge-router module, and then back in the left direction to reach module 6. The network coordinator can send messages/commands to any of the modules identified in the bitcircuit table for that assembled/interconnected bit-system.

Figure 22:
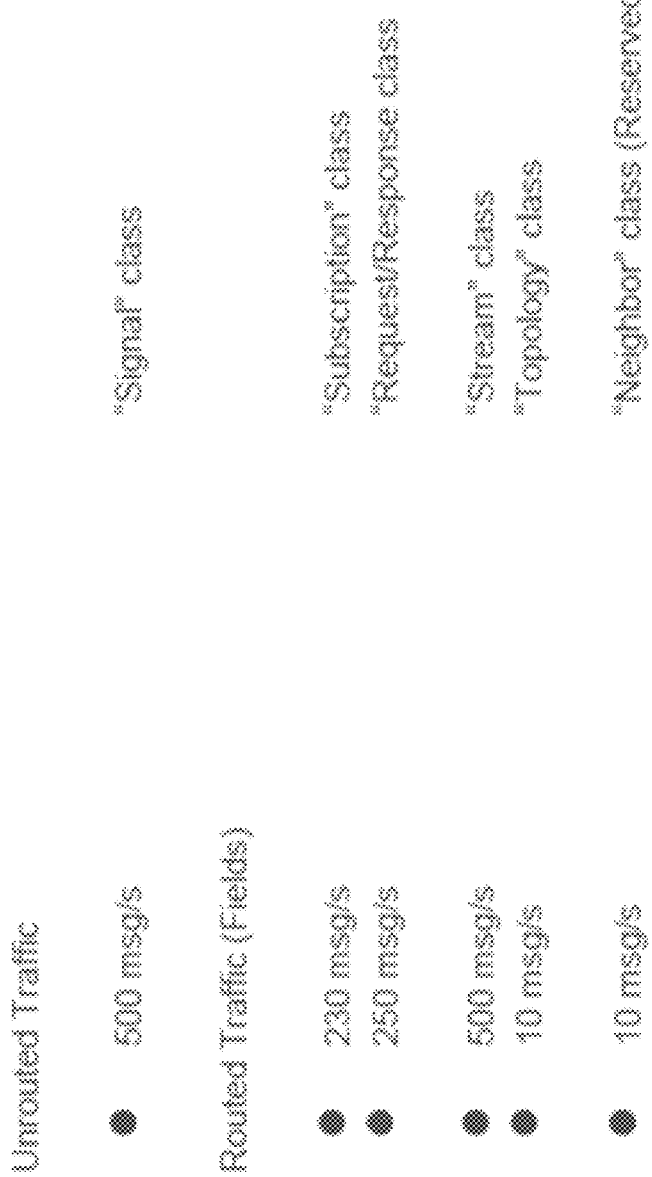

As described above, all messages originate on the network coordinator (e.g., the edge-router module or power module), which is responsible for managing the network traffic using "contract rules". Modules generate unrouted traffic in response to unrouted traffic and can be a message rate that is limited, for example, to a limit of 500 messages per second (msg/s). One of skill in the art will appreciate that other message limits may be set. In the embodiment shown in FIGS. 5-22, the network coordinator can start an unrouted message (note that input modules are not required to match input/output snap unrouted message rate). In other words, signals sent from one module can be sent/received at a higher rate than the rate at which other modules send/receive such signals. Further, in the embodiment shown in FIGS. 5-22, modules generate routed messages in response to a request from the network coordinator. FIG. 22 illustrates a Traffic Class Snapshot of unrouted and routed traffic. The "request/response" class messages are the RTS and CTS message signals sent and received between the modules in an assembled/interconnected bit-system. The "topology" class messages are the messages sent and received for the topology requests/responses between the network coordinator module and the other modules within the bit-system.

A "signal" class message is an unrouted message that is sent in a single direction (e.g., from left-to-right) throughout an assembled bitcircuit. For example, each module can receive a signal at its left bitsnap connector, process or modify it, and send it out of the right bitsnap connector of that module. For example, a signal message can instruct a LED on a module how bright to shine, or in another example, a slide dimmer can change the signal message based on the dimmer position, etc. Signal messages can be sent, for example, at 500 messages per second, enough to send audio through the circuit.

A "subscription" class message is a routed message that is sent to the network coordinator module from any other module in the circuit. It is designed to provide low-rate updates about each module back to the network coordinator module, and up to the connected software at the computer device. A subscription message can contain data from any field on the sending module, but will typically contain information about the current physical state of the module (e.g. the location of the slider on the slide dimmer module, the color of the LED on the RGB LED module, if a new bit has been connected to the circuit, etc.). When the data is received by the network coordinator module, it is then passed to the connected computer device (e.g., via USB or BLE) for the software to manage. Subscription packets are sent 10 times a second from all modules, and are often used to get "slow" data from a module.

A "stream" class and also "event" class (not shown in FIG. 22) messages are each also a routed message that is sent to the network coordinator from any other module in the bit-system. Stream messages are designed to carry high-rate, constant-rate data (e.g., audio played from a sound effects module) from a module in a bitcircuit back to the network coordinator module, and up to the software at the computer device, while event messages are designed to carry low-latency and infrequent data (e.g., error reports, notifications of mode changes, etc.) back to the network coordinator module, and up to the software at the computer device. Stream messages and event messages have a higher rate than subscription messages, up to 500 messages per second. This is a maximum message rate for the entire circuit, and is shared between both stream messages and event messages (e.g., in a circuit, there can be one 500 msg/s stream, or two 250 msg/s streams, one 50 msg/s event and nine 50 msg/s streams, etc.). The network coordinator module manages the active stream messages and event messages, and keeps track of the total bandwidth used.

"Neighbor" class messages are routed messages that are passed directly between two neighboring modules. These messages can be used, for example, to help identify when modules have joined the circuit, or are stuck in the boot-loader software. Neighbor class messages may also be used to negotiate special operating modes between neighboring modules (e.g. two neighboring sequencer modules would act like a single sequencer of double the length).

In another embodiment, further functionality can be included in a modular electronic building block system, such as the systems described herein, and/or included with other modular electronic building block systems. More specifically, in addition to the physical electronic modules described herein, a system can include digital building blocks to further enhance and integrate the functions of a bit-system that can be created by a user of the modular electronic building block system. Thus, in this embodiment, a modular building block system is a modular electronic and digital building block system. A digital building block (also referred to as "digital block" or "digibit") as described herein is not a physical module, but digital content or other software or cloud applications that can be represented as a virtual digital block, and that can interface with the physical modules of the modular electronic and digital building block system. The digital blocks are described and shown herein as having an appearance similar to or the same as the physical modules, but it should be understood that the digital blocks can be virtually represented in a variety of different manners. For example, the digital blocks can be virtually represented with icons, symbols, word(s), number(s), and any size, shape, etc.

The digital blocks can provide integrations between functionality of the physical building blocks and functionality of multiple different web-based applications, programs and systems. The electronic and digital building block system can include a visualizer embodied on a computer device (e.g., PC, tablet, phone, etc.) that can be viewed on the display of the computer device and show a visualization of the physical bit-system assembled by a user and allow the user to code the physical modules and/or link the functionality of the physical modules to a web-based and/or computer-based application, program, service, or system. For example, as described herein the functionality of the physical modules can be integrated with an external application, such as a web-based application or service, such as Google Sheets, to record data collected using the physical modules. In another example, as described herein the functionality of the physical modules can also be integrated with a program or file located on a personal computer (PC) of a user of the modular electronic and digital building block system. For example, a user can assemble a bit-system using the physical modules and then integrate the functionality with, for example, a spreadsheet created by the user and saved on the user's PC.

Figure 23:
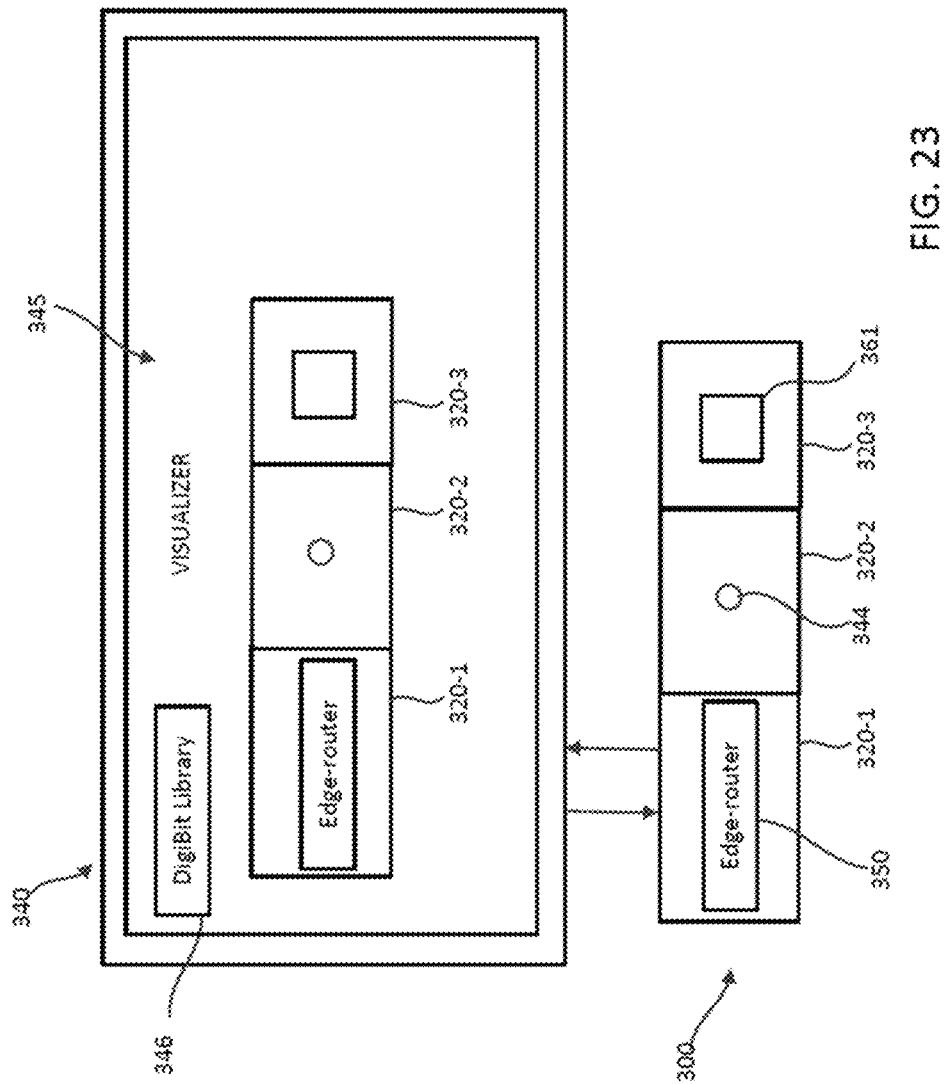
FIG. 23 is a schematic illustration of an electronic and digital building block system, according to an embodiment.
Figure 24:
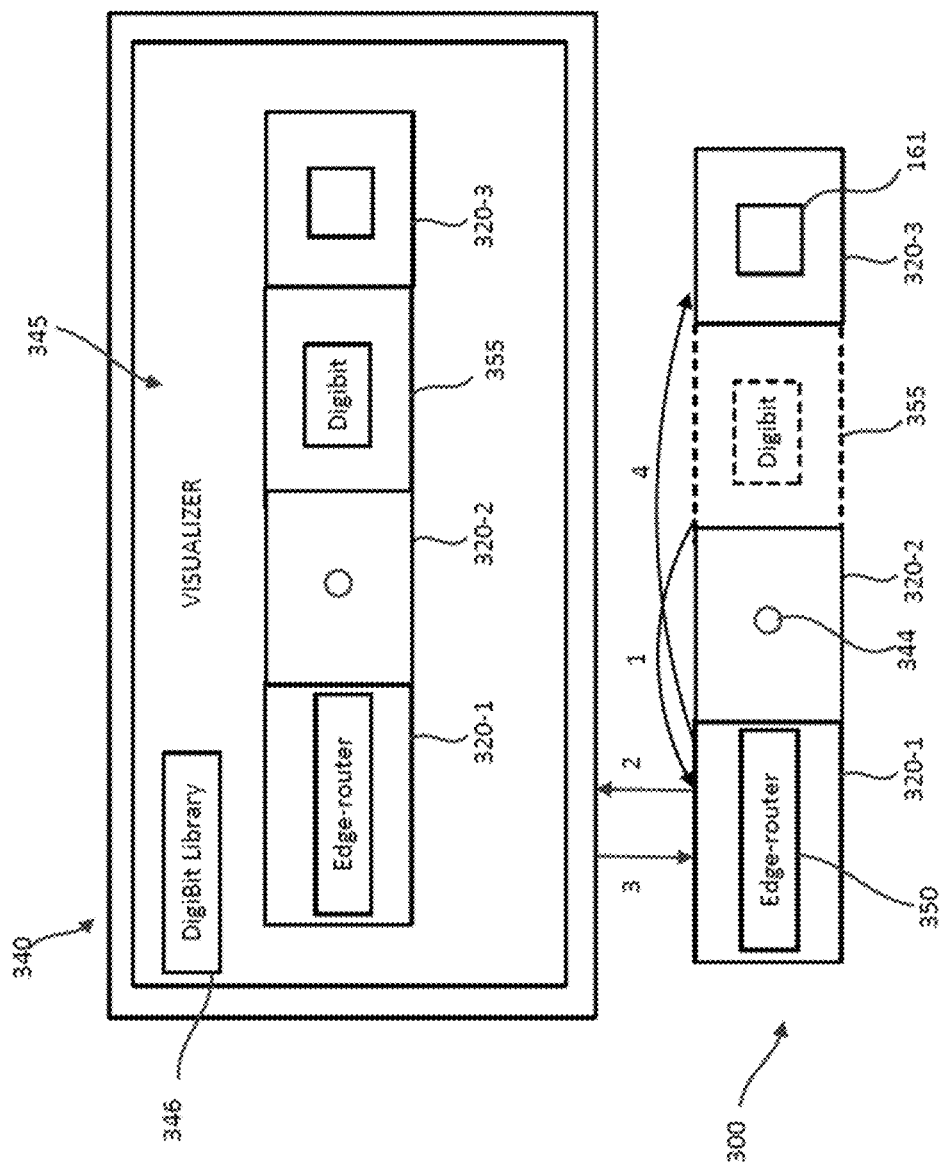
FIG. 24 is a schematic illustration of the electronic and digital building block system of FIG. 23 illustrating a digital building block.

FIGS. 23 and 24 illustrate a schematic representation of a modular electronic and digital building block system 300. The modular electronic and digital building block system 300 (also referred to as "system"), can include multiple electronic building block modules 320 that can be removably, mechanically and electrically coupled together in a variety of different configurations to form different circuits. The modules 320 can be coupled together as described herein for previous embodiments, or using other suitable coupling methods. The modules 320 can also include the various features and functions described above for previous embodiments. As shown in FIGS. 23 and 24, an assembled bit-circuit is shown that includes three physical modules 320-1, 320-2, and 320-3 mechanically and electrically coupled together. In this example embodiment, the modules 320-1 is a power module and includes an edge-router 350 and network coordinator functionality Module 320-2 is a sensor module with a sensor 344 and module 320-3 is a sound emitter module with a sound emitter component 361 that can for example, emit sound, such as, a buzzer, alarm, music, etc. The bit-system 300 can be in communication with a computer device 340 (e.g., PC, tablet, phone, etc.) via the edge-router 350 in the power module 320-1 either by a wired or wireless connection.

The edge-router 350 within the power module 320-1 can perform network coordinator functions as described herein and can have functionality to detect and identify the topology of the bit-system 300. In some embodiments, the topology detection functionality can be the same as described above for previous embodiments. In other embodiments, the edge-router can use other methods of topology detection. As described above, the topology detection function allows the edge-router within the power module to identify all the modules in the bit-circuit and to communicate that information to the computer device 340.

The system 300 can interact with and communicate with a system program (software) available/accessible by a user via the computer device 340. The system program provides an interface between the system 300 and other programs, applications, web-based services, etc. The system program can be stored on and operated on the computer device 340 or be accessible from a server and/or a cloud. The system program allows a user to code the bit-system to perform desired functions. The system program also provides a platform for users to interface with other programs, applications, web-based services as described in more detail below.

The system program includes code to control a visualizer 345 that can be used to view a virtual representation of the physical bit-system created by the user. As shown in FIG. 23, the physical modules 320-1, 320-2, 320-3 (collectively referred to as modules 320) are shown in the physical world on the bottom in FIG. 23, and the virtual representation of the modules 320 is shown in the display of the computer device 340 by the visualizer 345. A user can assemble (e.g., interconnect) the physical modules and log-in to the system program via the computer device 340 to link the modules in the physical world to the virtual world. As described above, the edge-router can communicate the topology of the physical bit-system 300 to the system program accessed via the computer device 340. The system program can then automatically create the virtual representation of the physical modules within the visualizer 345 as shown in FIG. 23. For example, after the user logs into the system program, the topology is automatically communicated to the system program via the edge-router as described above. A virtual representation of the physical modules can then be displayed within the visualizer 345.

With the physical modules virtually represented within the visualizer 345, the user can create code (or for example, download code from another program or entity) via the system program to instruct one or more physical modules to perform a desired function. The system program can also provide an interface to other programs and services located on the computer device, or located in a cloud, or server accessible via the Internet. For example, the system program can include code (using API's) to link a user's account with the system program with the user's account with a third-party service such as, for example, Google Sheets, Twitter, Alexa, etc. The physical modules can then communicate directly with the third-party service and communicate data generated with the physical modules of the bit-system 300 to the third-party service. Links to the third-party services can be represented as a digibit 355 selected from a DigiBit Library 346, for example, via a drop-down menu, or selectable icons. A digibit 355 is a software-based capability within or in communication with the system program that links the software of the system program and/or a physical module(s) to a third-party service (or third-party app or software), and that can be represented digitally virtually within the virtualizer 345. For example, a user can select a digibit 355, such as Google Sheets, from the DigiBit Library. The user can log into his/her account at Google Sheets and using an interface provided by the system program (e.g., javascript with customized coding), the system program can link the physical modules to the user's account on Google Sheets. With the interface in place, the Google Sheets application does not need to remain open to maintain a link between the physical modules and Google Sheets. The system program includes an API that serves as an interface between the system program and the Google Sheets application. Thus, data generated by the physical modules of a bit-system can be sent to the Google Sheets application through the system program link even when the Google Sheets application is closed. For example, after a user is signed in to their Google account, the code within the system program can include an email or authorization code or token that can be passed into a digibit. The digibit uses this authorization code or token to post data to an external service. In the case of the Google Sheets digibit, for example, the data is sent via the API from the system program, which will forward the request to the Google Sheets application.

Figure 25:
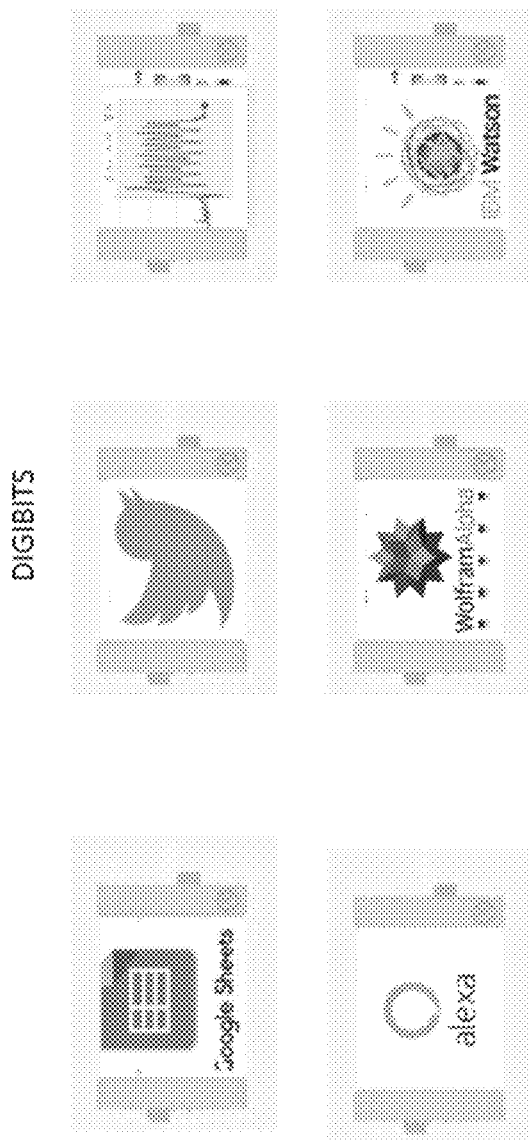

The digibit 355 can be digitally/virtually inserted into the circuit of the bit-system 300 as viewed on the visualizer 345, as shown in FIG. 24. FIG. 24 also illustrates the physical modules 320 as including the digibit 355 (shown in dash line); this is, however, only for illustration purposes as the digibit 355 is not in the physical world. In some embodiments, the digibits 355 can be configured to resemble a virtual digital image of the modules of the bit-system as they are viewed on the visualizer 345. For example, as shown in FIG. 25, multiple different example representations of digibits are illustrated. The digibits 355 can function as an input module or an output module as described in more detail below.

When the digibit 355 is virtually added to the bit-system, the topology of the bit-system can be updated. In the example of FIG. 24, with the digibit 355 virtually added to the circuit of bit-system 300, the module 320-2 can communicate to the edge-router 350 (shown as arrow 1) that its right side connector (in this example) is now virtually connected to the digibit 355. The edge-router 350 can communicate the updated topology data to the system program, shown by arrow 2 in FIG. 24. The system program can then send a message back to the edge-router 350 (shown by arrow 3 in FIG. 24), which in turn can send the message to the input connection (left side in FIG. 24) of the module 320-3 to inform the module 320-3 of the virtual connection to the digibit 355.

In the example of FIGS. 23 and 24, the digibit 355 is virtually inserted between the sensor module 320-2 and the sound emitter module 320-3, and can be a link to, for example, Google Sheets. In one example, the sound emitter module 320-3 can be programmed to sound an alarm when the temperature reading from the temperature sensor of module 320-2 is over a threshold temperature. The user can write further code, or select or activate other code, such as, for example, predefined code downloaded from another program or file, that instructs the sensor module 320-2 to output data to the digibit 355 when the temperature reaches a certain temperature, or to output the temperature data at a certain time, or if the temperature is a certain temperature for a designated time period, for example. The new code instructions can be sent to the edge-router 350 (arrow 3 in FIG. 24), which can then communicate the new instructions to the module 320-3 (arrow 4 in FIG. 24). The data output from the module 320-2 can be sent to the digibit 355 and captured in Google Sheets. For example, the data output from module 320-3 is sent via routed messages to the edge-router 350, which then sends the data to Google Sheets via the interface and link described above. In this example, the digibit functions as an output module.

In another example, a digibit can function as an input module. For example, the digibit can be a link to an email, or message service such as Slack. The digibit can be added to the bit-system in the manner as described above, and code can be written (or downloaded from another program or entity), for example, to cause an output module in the physical bit-system to sound an alarm when a message comes into the user's account, or a message from a particular person or entity, etc. Further to this example of the digibit being a link to an email or message service, such a link could also function as an output module. For example, in the example bit-system 300 described above, instead of a Google Sheets digibits, a messaging digibit can be inserted between modules 320-2 and modules 320-3. The system program can be programmed to send a message to, for example, an email address if the temperature exceeds a certain temperature. Thus, digibits can be links to a variety of different types of electronic media (e.g., Twitter, Google Sheets, email accounts, Alexa, Google Classroom, Visualization, etc.), which can be accessible to and/or by a physical bit-system in a variety of different manners to provide a variety of different functions. The digibits can become modules of a modular electronic building system as described herein.

Figure 26:
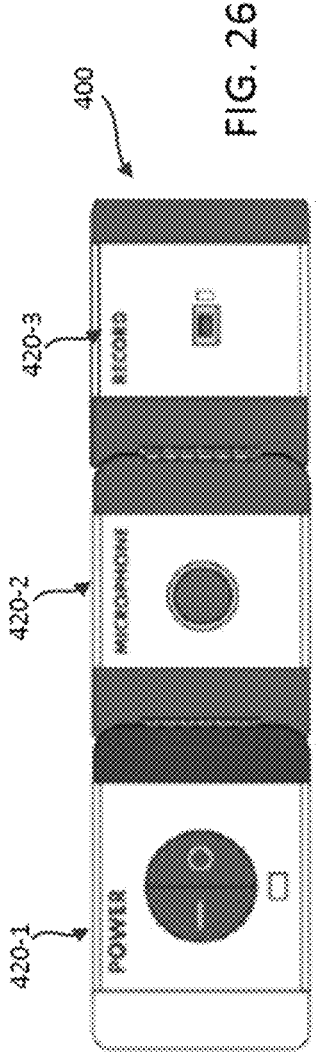

FIG. 26 illustrates an example of a portion of a bit-system 400 that includes three physical modules, 420-1, 420-2, 420-3 interconnected together. Module 420-1 is a power module, and modules 420-2 and 420-3 are both input modules. Module 420-2 includes a microphone for audio capability and module 420-3 includes imaging capability (e.g., video recording). The assembled bit-system 400 is an example of a "superbit," which can combine the functionality of the two input modules to provide an output that includes audio and video.

Figure 28:
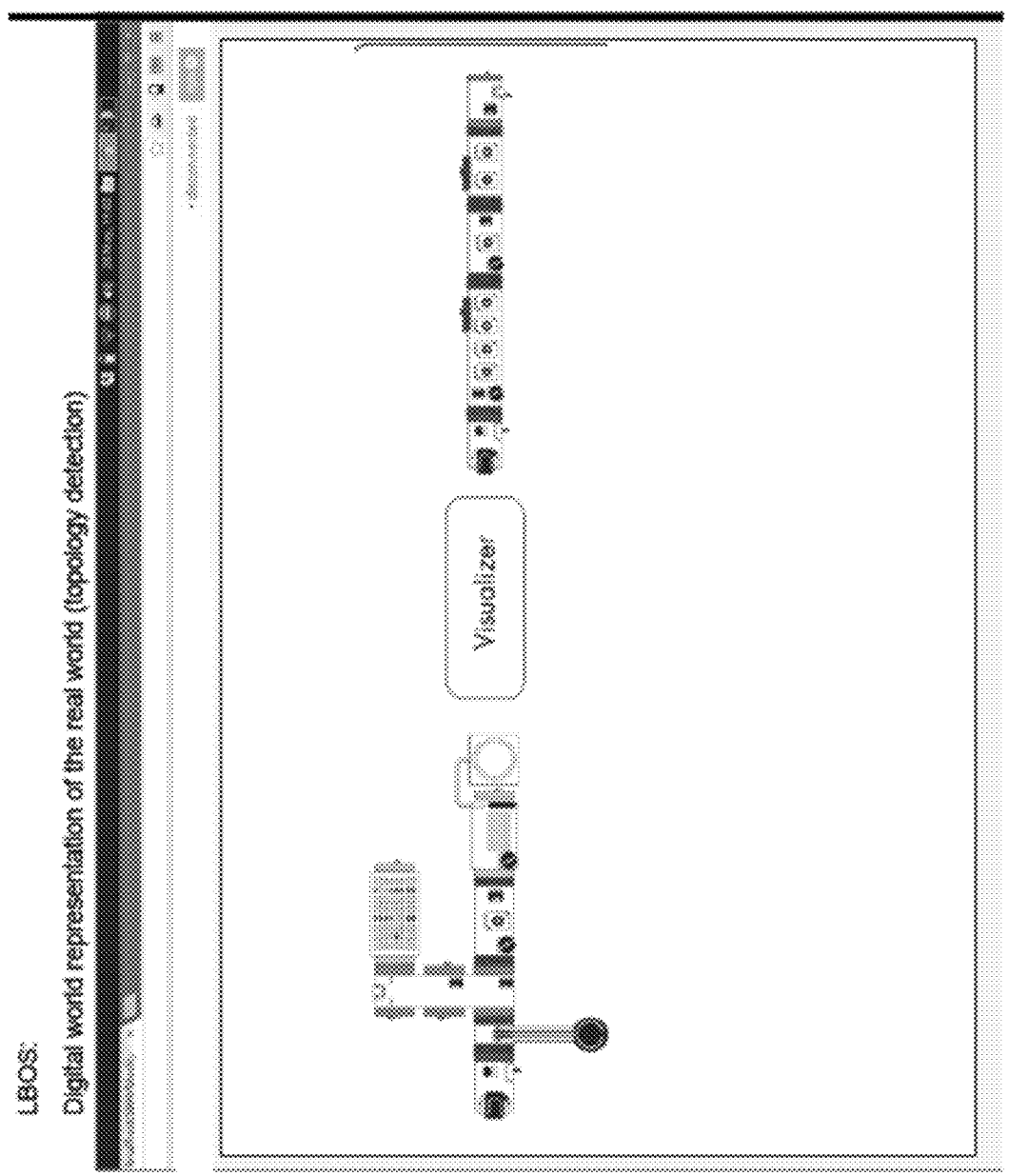

FIGS. 27-34 provide various illustrations and descriptions related to the features and functions of the modular electronic and digital building block system. FIG. 27 provides further information related to the visualizer and how it uses the topology detection of the physical assembled bit-system to create the virtual/digital view of the bit-system within the visualizer viewable by a user. FIG. 28 illustrates an example screenshot of a display on a computer device in which a user can view an image of a virtual representation of physical modules of a bit-system viewable on a visualizer. FIG. 29 illustrates an example screenshot of a display on a computer device in which a user can view and access a Bit Library and a Digibit Library, and an image of a virtual representation of physical modules of a bit-system viewable on a visualizer. As described above, links to the third-party services can be represented as a digibit in the Digibit Library and accessible, for example, via a drop-down menu or icons, etc. The Bit Library can include representations of the various physical modules that can also be accessible, for example, via a drop-down menu or icons, etc. Digibit icons can also, for example, be clicked on and dragged and dropped into the visualizer at a desired location within the virtual representation of the physical bit-system. The Bit Library containing a library of representations of the available physical modules can provide information about the various modules.

Figure 30:
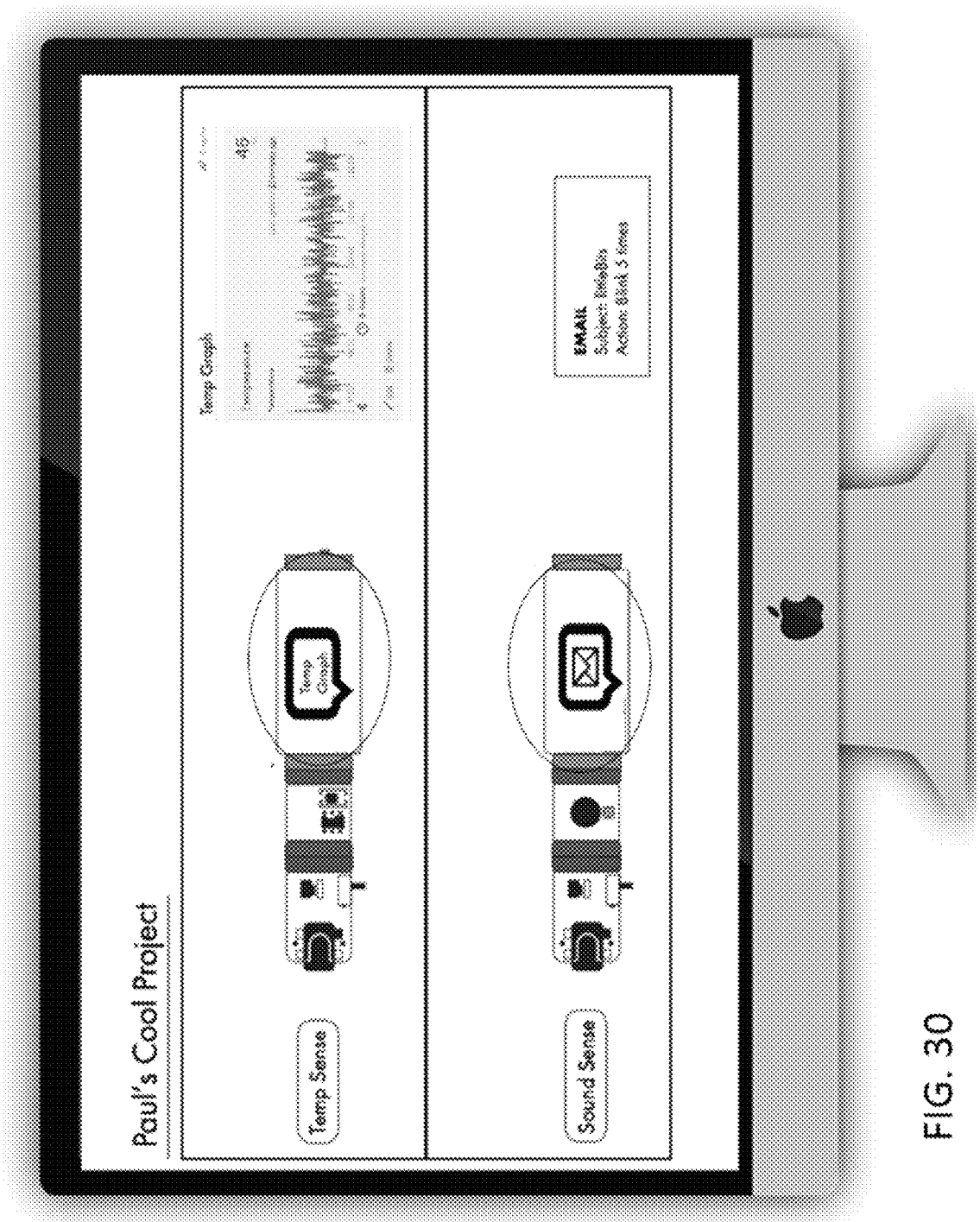

FIG. 30 illustrates two example outputs viewable on the visualizer. The top part shows a digibit that receives output from a physical temperature sensor module and an output graph generated therefrom. The bottom part shows a digibit that receives output from a sound sensor that can send the output data to, for example, cell phone via a text message (SMS) and/or can send to a device, such as an Alexa device via email and instruct it to, for example, blink 5 times if a particular sound data is received at the sound sensor module.

Figure 31:
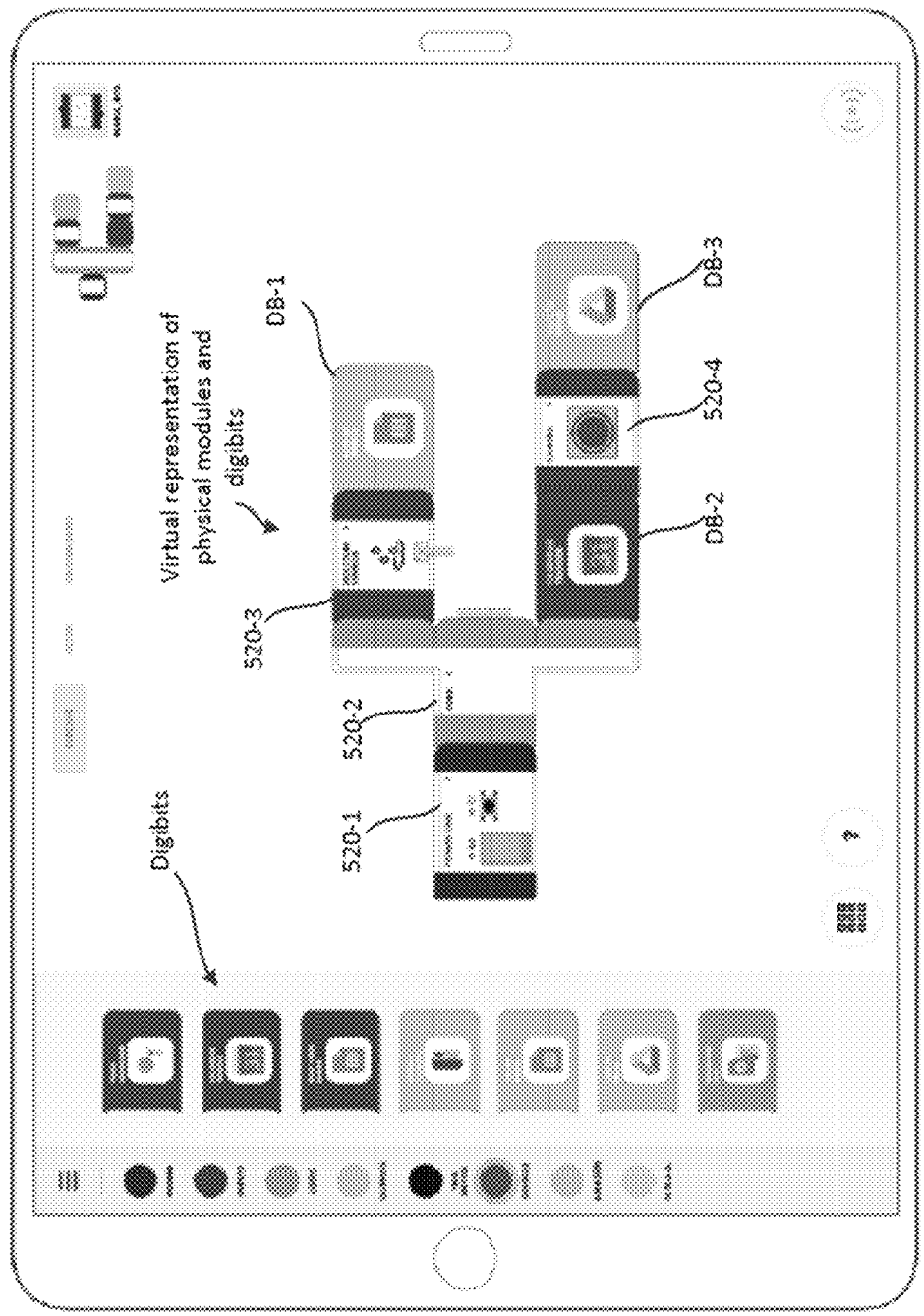

FIG. 31 illustrates a screenshot of an example visualizer with a virtual representation of physical modules of a bit-system along with inserted digital blocks (digibits). FIG. 31 also shows virtual representations of additional digital blocks on the left side of the screenshot. The physical modules of the bit-system include a power module 520-1 connected to a fork module 520-2, which is connected to a moisture sensor module 520-3 and to a camera modules 520-4, each of which is shown virtually within the visualizer. In addition, in the visualizer, three digibits have been inserted into the virtual representation of the bit-system 500. More specifically, a virtual representation of a digibit DB-1 is shown connected to module 520-3, a virtual representation of a digibit DB-2 is shown connected between the fork module 520-2 and the camera module 520-4 and a digibit DB-3 is shown connected to the camera module 520-4 on an opposite side as the digibit DB-2.

Figure 32:
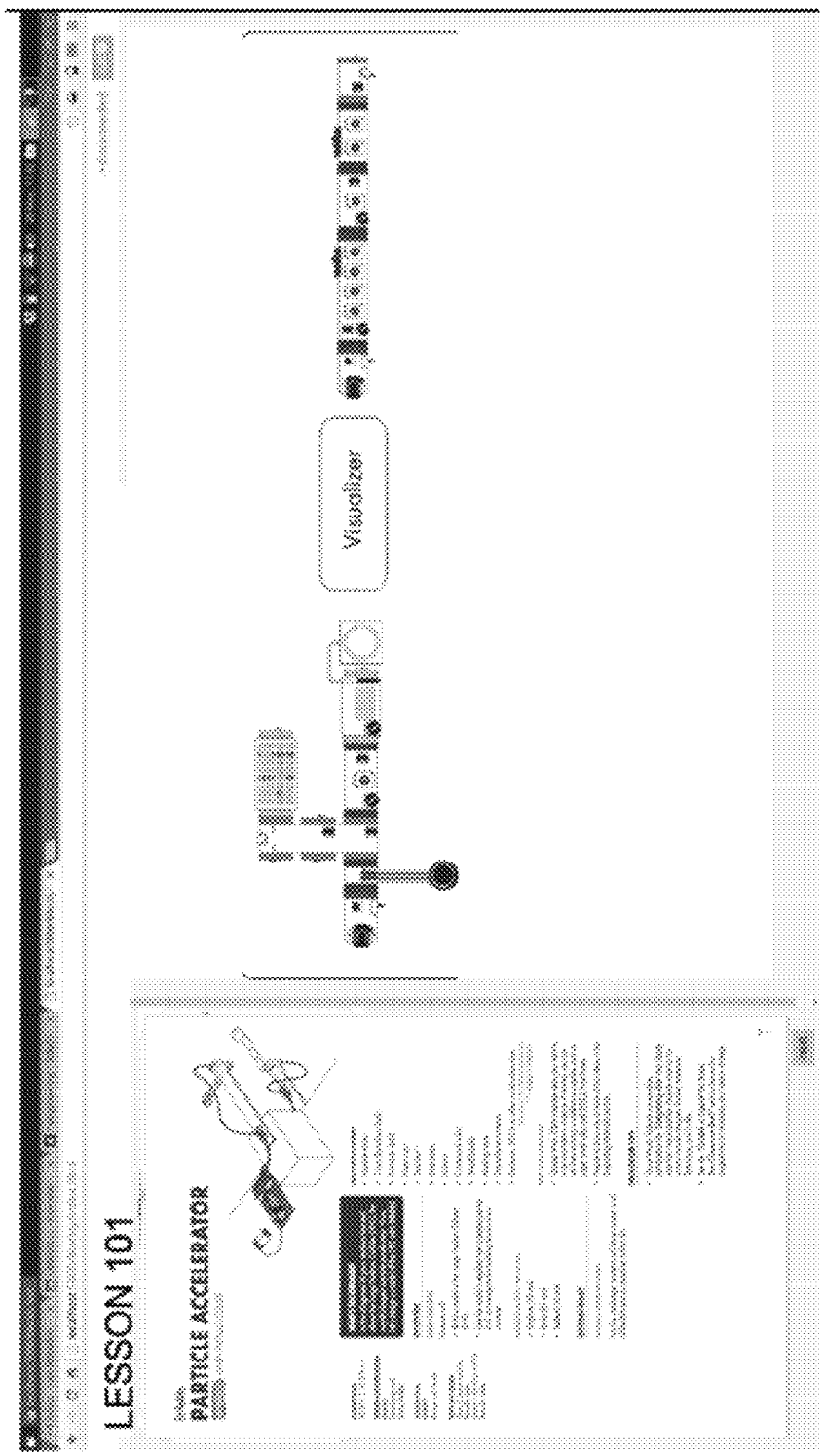
Figure 33:
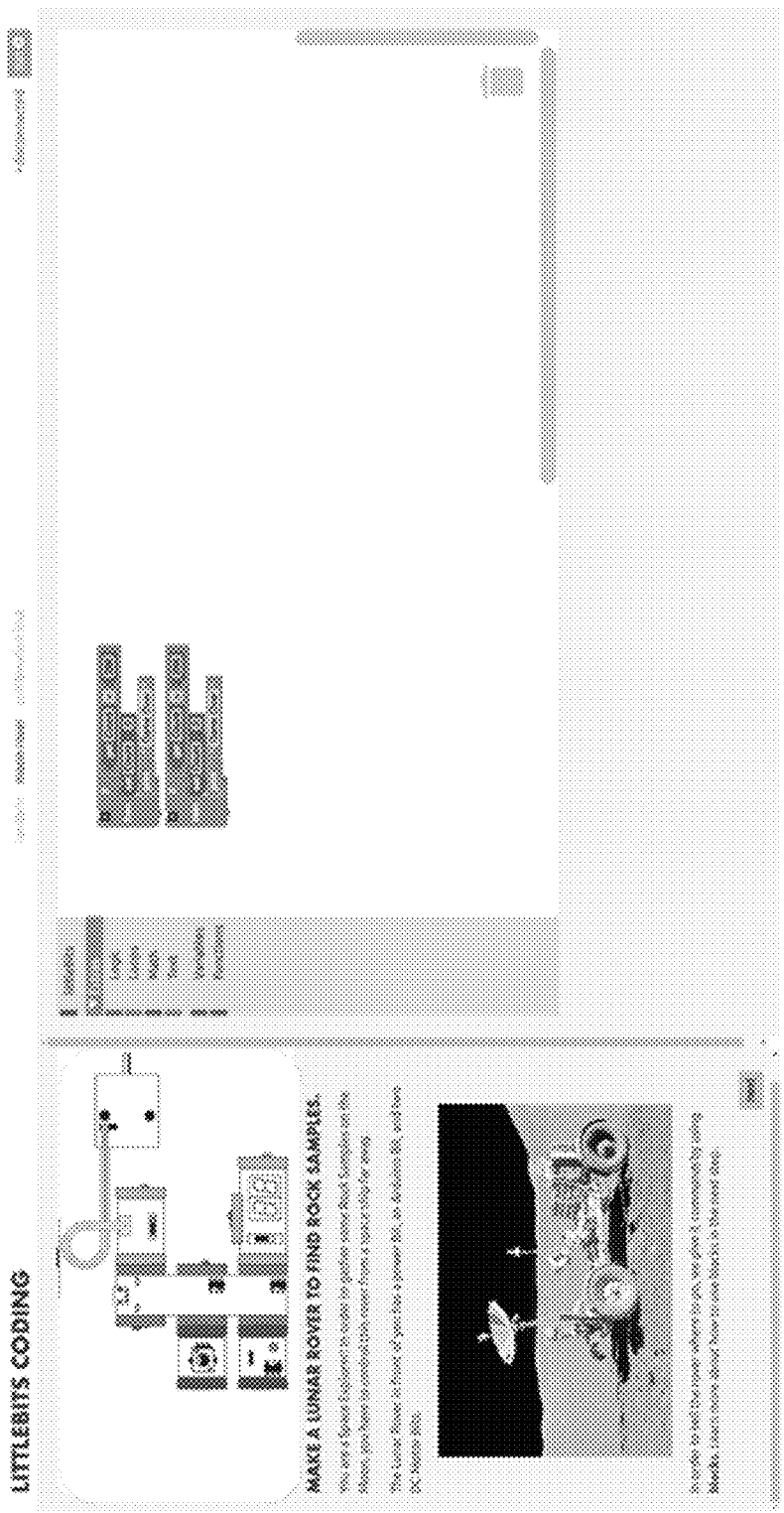

FIGS. 32 and 33 illustrate two additional example applications of the modular electronic and digital building block system described herein. FIG. 32 illustrates an example where the system can be used for teaching purposes. The lessons can be pulled from a workbench according to a topic selected, or based on the physical modules of an assembled bit-system. Lessons can be, for example, webpages or provided as PDF, and do not need to be interactive. FIG. 33 illustrates example Coding application of the system. A user can, for example, click on a bit (digital representation of a module) in the Bit Library, and enter a coding canvas. A lesson or video can be made accessible to instruct the user how to code the bit.

Figure 34:
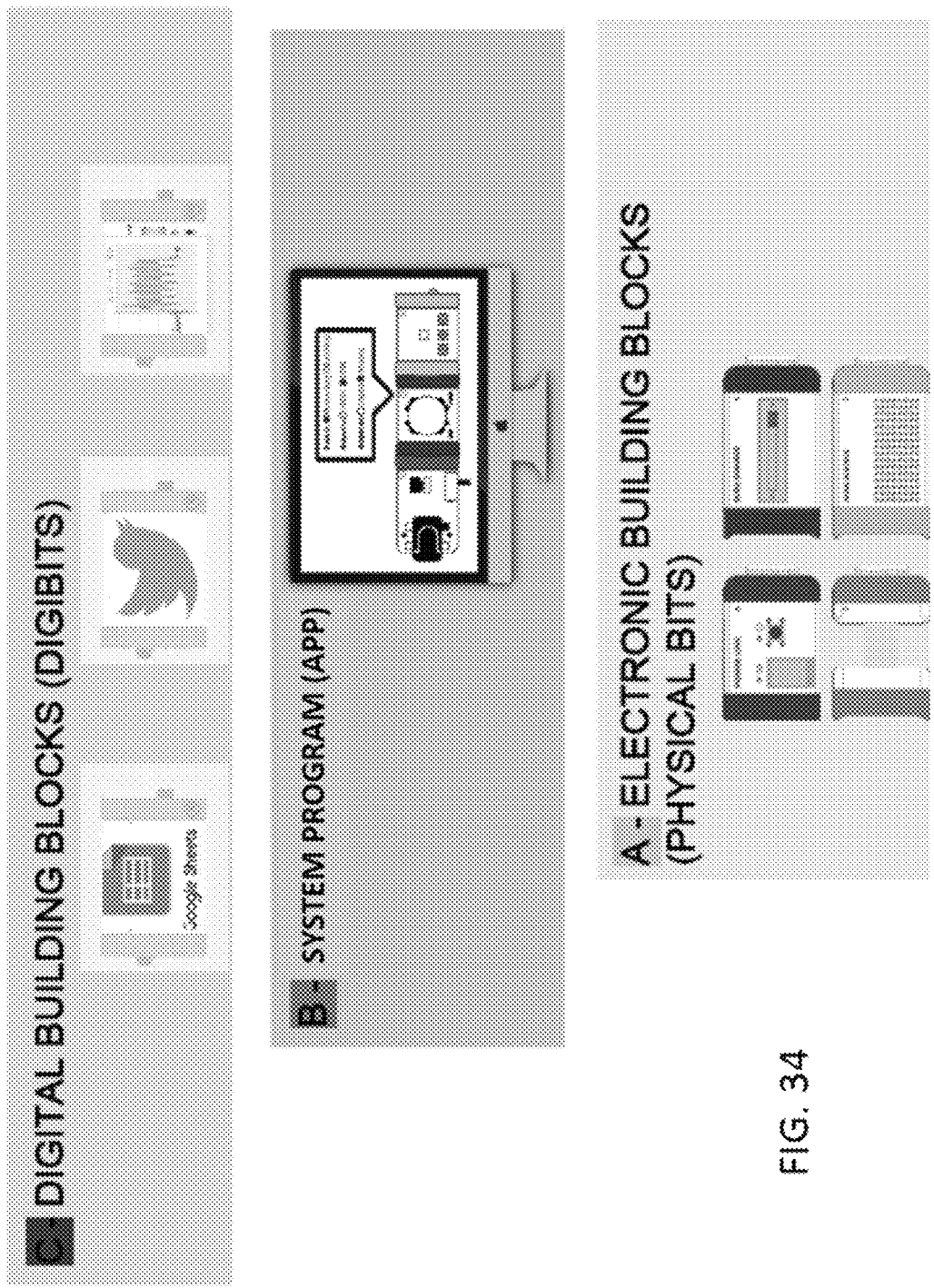

FIG. 34 illustrates three layers of a modular electronic and digital building block system ("system") as described herein. As shown in FIG. 34, and as described herein, a system can include digital building blocks, as shown in block A in FIG. 34, the system program (including software and/or apps) embodied on a computer device, shown in block B in FIG. 34, and the physical electronic building blocks ("physical bits"), as shown in block C in FIG. 34). The various physical electronic building blocks and the system program can communicate with each other as described herein. Similarly, the system program and the software represented by the digital building blocks can communicate with each other as described herein.

The modules described herein can each include a processor, microprocessor, controllers or any other suitable type of processors for processing computer executable instructions to control the operation of the modules and system. The functionality described herein can be performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The computer executable instructions executed by the processors are provided using any computer-readable media that is accessible by the processors. Computer-readable media includes, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device.

Figure 35:
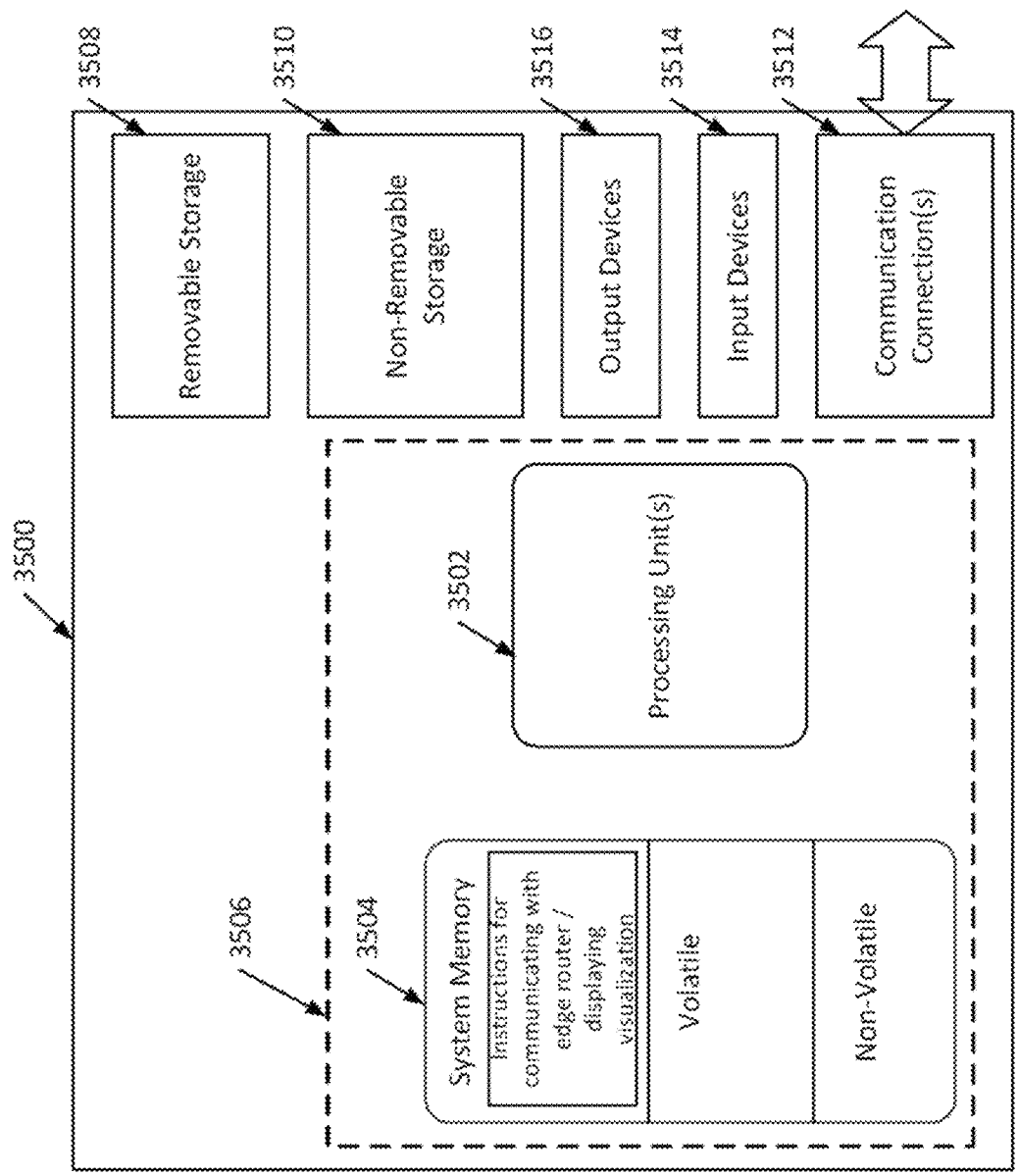
FIG. 35 illustrates a simplified block diagram of the device with which aspects of the present disclosure may be practiced in accordance with aspects of the present disclosure.

FIG. 35 illustrates a simplified block diagram of the device with which aspects of the present disclosure may be practiced in accordance with aspects of the present disclosure. One or more of the present embodiments may be implemented in an operating environment 400. This is only one example of a suitable operating environment and is not intended to suggest any limitation as to the scope of use or functionality Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 3500 typically includes at least one processing unit 3502 and memory 3504. Depending on the exact configuration and type of computing device, memory 3504 (instructions to communicating with an edge-router and/or displaying a digital visualization) may be volatile (such as RAM), non-volatile (such as ROM, flash memory, etc.), or some combination of the two. This most basic configuration is illustrated in FIG. 35 by dashed line 3506. Further, the operating environment 3500 may also include storage devices (removable, 3508, and/or non-removable, 3510) including, but not limited to, magnetic or optical disks or tape. Similarly, the operating environment 3500 may also have input device(s) 3514 such as keyboard, mouse, pen, voice input, on-board sensors, etc. and/or output device(s) 3516 such as a display, speakers, printer, motors, etc. Also included in the environment may be one or more communication connections, 3512, such as LAN, WAN, a near-field communications network, point to point, etc.

Operating environment 3500 typically includes at least some form of computer readable media. Computer readable media can be any available media that can be accessed by processing unit 3502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 3500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Although embodiments of systems and modules are shown and described as having a connector (e.g., connectors 124, 126) disposed at one end or two opposite ends of a circuit board (e.g., circuit board 122) and housing structure, in other embodiments, a module can include connectors disposed at more than two ends of the module or less than two ends of the module. For example, in some embodiments, a module can include a single connector disposed on one end portion of the housing structure. In some embodiments, a module can include two connectors disposed along a single end or side portion of the housing structure. In some embodiments, a module can include, for example, three or four connectors each disposed at three or four different edges or end portions of the housing structure.

In some embodiments, the systems and modules described herein can include one or more contacts or conductors, and one or more contact assemblies. The contacts or contact assemblies can be) disposed at opposite end portions of the module that have the same structure or the contacts or contact assemblies can have different structures. For example, in some embodiments, a system can include modules that each include a first contact assembly disposed at a first end portion of the module that has a different structure than a second contact assembly disposed at a second end portion of the module. In such an embodiment, the first contact assembly may be configured to electrically couple only to a second contact assembly of another module of the system. In some embodiments, a system can include modules with contacts or contact assemblies on each end portion of the modules that have the same structure and can electrically couple to any contact assembly of any module of the system. In some embodiments, a module as described herein can include a contact assembly disposed on only one end or side portion of the module. For example, a module can include a connector portion on opposite end portions of the module to allow the module to connect to another module, but with only one of the connector portions having a contact assembly. The opposite end portion of the module can include contacts that can electrically engage the contacts from the contact assembly of another module. In some embodiments, a system can include modules with connectors on one or more of the ends and/or one or more of the sides of the module. In some embodiments, a system can include modules with one or more contacts or contact assemblies on one or more ends and/or one or more sides of the modules.

As described herein, modules of an electronic building block system are adapted to have a variety of different types of functionality and to include the appropriate connectors, circuit boards, and associated electrical components coupled to the circuit boards to perform the desired functionality. The modules shown in the illustrated embodiments are for exemplary and demonstrative purposes, and are not intended to be limiting.

It should be understood that the structures, features, functionality, and other characteristics of the various example embodiments of the systems disclosed herein and illustrated in FIGS. 1A-34 may be combined with each other in any manner and in any combination or sub-combination and all such manners and combinations are intended to be within the spirit and scope of the present invention.

As described above in the many examples of modules and systems, numerous modules may be coupled together to achieve various functionalities of the systems. Modules may be coupled in a cascading manner in which the inclusion of one module in the system may affect the functionality of downstream modules in a first manner and inclusion of a different module in the system may affect the function of downstream modules in another manner different than the first manner That is, modules coupled together in a system may have dependencies upon one another to affect functionality thereof and of the entire system. A simple example to demonstrate this concept, but is not intended to be limiting, includes a system having three modules, for example, a power module, a button module, and an LED module. The button module and the LED module are dependent on the power module, and the LED module is dependent on the button module. To demonstrate the dependency of the button module and the LED module on the power module, if the power module is not providing any power, then neither the button module nor the LED module can operate in their intended manner. Similarly, to demonstrate the dependency of the LED module on the button module, if the button is not depressed or otherwise activated to close the circuit, the LED module will not be illuminated, and if the button is depressed, the LED module will be illuminated. In other words, cascading modules in a system affect operation and functionality of downstream modules. In some embodiments, if the button is not disposed between the LED and power module, the LED will illuminate and the button will have no function.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

Where methods described above indicate certain events occurring in certain order, the ordering of certain events may be modified. Additionally, certain of the events may be performed concurrently in a parallel process when possible, as well as performed sequentially as described above.

In addition to the previously described exemplary connectors, many modifications to the modules and components of the modules, such as the connectors, are possible, including, but not limited to, the housing of a connector, the type of conductors or contacts used, the number of conductors or contacts, as well as the number of magnets, the shape of the magnets, the polarity of the magnets, the manner in which the connectors are couple to the circuit board of the module, etc.

In some embodiments, the connectors can include protrusions and recesses that can complimentarily fit such that the protrusions and recesses are interlocked such as with a dove-tail shape or configuration, or other interlocking shape and configuration. In some such embodiments, the protrusions can be slidably received within the recesses in a vertical direction and interlock such that the coupling of the protrusions and recesses can removably couple a first module to a second module. The dovetail configuration would prevent movement between the two modules in a horizontal direction. To uncouple the first module from the second module, the module with the dovetail protrusions could be uncoupled from the module with the dovetail recesses by sliding the module with the protrusions vertically out of the recesses. Thus, in such an embodiment, other connector components, such as magnets may not be included and used to couple a first module to a second module. In some embodiments, the modules may not include a protrusion(s) and mating recess(es) and instead rely solely on magnets to maintain the position of a first module relative to a second module when coupled together with the magnets.

In another example, in an alternative embodiment, a system can include modules with housings for both connectors (e.g., 124, 126) that can be monolithically or integrally formed and the circuit board (e.g., 122) can be encased within the housing. Alternatively, in some embodiments, the housings for both connectors (e.g., 124, 126) can be monolithically or integrally formed and the circuit board (e.g., 122) can be coupled to the housing. For example, the circuit board can be coupled to a top portion or a bottom portion of the integrally formed housing. In some embodiments, the housings for both connectors (e.g., 124, 126) can be monolithically or integrally formed and can define a slot or pocket in which the circuit board (e.g., 122) can be disposed.

Although in some embodiments, the mounting portions (e.g., 130) were shown and described as being disposed on a bottom side of the connectors (e.g., 124, 126), in alternative embodiments, the mounting portions can be disposed on a top side of the connectors or a top side of the circuit board of a module. If the mounting portions are disposed on a top side of the connectors, the circuit board could be coupled to a bottom side of the connectors.

In some embodiments, the mounting portions (e.g., 130) can include a post or a partial post (e.g., half-post or quarter-post) that can be received within an opening or space of a component or block of a different interlocking building block system. In some embodiments, the mounting portions can be configured to be coupled to a mounting component, such as a mounting board or other intermediary component that can then be coupled to a component or block of a different interlocking building block system.

What is claimed is:

1. A system comprising at least two or more connected physical modules, the system comprising:
   a first physical module connected to a second physical module, wherein the first physical module comprises an edge-router and performs network coordinator functions with a remote device over communication channel; and
   the second physical module physically coupled to the first physical module via a removable mechanism, the second physical module in communication with the remote device via the edge-router on the first physical module, wherein the edge-router communicates with the remote device via a wireless connection;
   wherein the first module transmits a message to the second module and wherein the second physical module increments a current block field and compares the current block field to a length field, wherein the length field and the current block field are stored in a route table.

2. The system of claim 1, wherein the first module is further operable to transmit the message from the remote device to one or more connected physical modules.

3. The system of claim 2, wherein the edge-router communicates with the remote device via a wired connection.

4. The system of claim 1, further comprising a third physical module physically coupled to the second physical module.

5. The system of claim 1, wherein the message comprises a configuration field, the length field, a payload field and a CRC field.

6. The system of claim 1, when the length field equals the incremented block field, the second physical module processes the message.

7. The system of claim 1, when the length field does not equal the incremented block field, the second physical module transmits the message to the third physical module.

8. The system of claim 4, wherein the first physical module receives a subscription message from the second physical module, the subscription message providing updates about the second module and the third module, and wherein the first physical module provides the subscription message to the remote device via the edge-router.

9. The system of claim 4, wherein the first physical module receives a signal message from the remote device via the edge-router, wherein the signal message is an unrouted message that is sent in a single direction from the first physical module to the third physical module via the second physical module.

10. The system of claim 4, wherein the second physical module receives a neighbor message from the third physical module upon connection of the third physical module, and wherein the neighbor message identifies the third physical module as connecting to the second physical module.

* * * * *